United States Patent [19]

McLeod

[11] 3,917,648

[45] Nov. 4, 1975

[54] GALVANIC COATING COMPOSITIONS COMPRISING POLYOL SILCATES AND ZINC DUST

[75] Inventor: Gordon D. McLeod, Adrian, Mich.

[73] Assignee: G. D. McLeod & Sons, Incorporated, Adrian, Mich.

[22] Filed: Aug. 28, 1972

[21] Appl. No.: 283,964

Related U.S. Application Data

[63] Continuation-in-part of Ser. No. 107,578, Jan. 18, 1971, abandoned, which is a continuation-in-part of Ser. No. 75,306, Sept. 24, 1970, abandoned.

[52] U.S. Cl............... 260/32.8 SB; 106/1; 106/14; 260/2 SB; 260/33.4 SB; 260/33.6 SB; 260/37 SB
[51] Int. Cl.² ..................... C08L 83/00; C08K 5/07
[58] Field of Search............. 260/37 SB, 33.6, 33.4, 260/25 B, 32.8; 106/1, 14, 287 SE

[56] References Cited
UNITED STATES PATENTS

| | | | |
|---|---|---|---|
| 2,027,931 | 1/1936 | Ray................................. | 106/286 X |
| 2,048,799 | 7/1936 | Lawson.................. | 106/287 SE UX |
| 3,056,684 | 10/1962 | Lopata et al......................... | 106/14 |
| 3,112,538 | 12/1963 | Emblem.................. | 260/448.8 A X |
| 3,392,130 | 7/1968 | Rucker et al. .................... | 106/14 X |
| 3,475,185 | 10/1969 | Freyhold........................... | 106/14 X |
| 3,489,709 | 1/1970 | Halsey........................ | 260/33.4 SB |
| 3,607,319 | 9/1971 | Scott............................... | 106/38.35 |
| 3,649,307 | 3/1972 | Oken ............................... | 106/14 X |
| 3,730,743 | 5/1973 | McLeod............................... | 106/1 |

OTHER PUBLICATIONS

Herzka; International Encyclopedia of Pressurized Packaging: Pergamon Press; 1968; p. 532.

*Primary Examiner*—Lewis T. Jacobs
*Attorney, Agent, or Firm*—Morton, Bernard, Brown, Roberts and Sutherland

[57] ABSTRACT

Galvanically-protective coating compositions are prepared comprising polyol silicates and zinc dust. The compositions provide long-life protection for steel against rusting in moist and salty atmospheres. The zinc and silicate components may be compounded in one package or as two packages to be mixed prior to application as a film. Compositions comprising zinc and the polyol silicates with solvents, and with or without fillers or organic polymeric materials are especially useful as coatings. The range of polyol to organic silicate employed in making the polyol silicates is about 0.05 to 1.8 moles of reactive OH grouping supplied by the polyol per mole of ester-exchangeable group in the silicates the larger ratios being especially useful for the monomer type silicates and decreasing as the

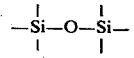

content increases.

44 Claims, No Drawings

GALVANIC COATING COMPOSITIONS COMPRISING POLYOL SILCATES AND ZINC DUST

This application is a continuation-in-part of my application Ser. No. 107,578, filed Jan. 18, 1971, now abandoned which in turn is a continuation-in-part of my application Ser. No. 75,306, filed Sept. 24, 1970, now abandoned.

The present invention relates to compositions which ara particularly useful in coatings that provide galvanic protection when cured on ferrous substrates. These coatings contain as essential ingredients solvent-soluble, aliphatic polyol silicate and metallic zinc in finely divided form. The invention is also directed to liquid solutions containing the polyol silicate and an organic solvent for the silicate which solvent is compatible therewith and does not cause the composition to rapidly gel or change greatly to produce an undesirable composition. Although these solutions may be used in various types of coating compositions, the invention especially combines metallic zinc with these solutions to provide slurries or dispersions which can be applied and cured as coatings on ferrous surfaces and thereby protect the substrates by galvanic action against the deteriorating effects of corrosive environments. The preferred polyol silicates of the present invention, when composited with finely divided metallic zinc, give relatively stable products which remain essentially ungelled and in usable condition over long periods of time. These preferred products when kept in a moisture-tight and air-tight container, are stable for relatively long periods of time against substantial changes in properties, e.g., against becoming objectionably viscous to a point of gelling. Thus, these preferred compositions offer the great advantage of being single-component coating compositions which are more stable for longer periods of time than heretofore known alkyl silicate binders and which can be readily applied to ferrous substrates and very rapidly self-cured under various atmospheric conditions—dry, rainy, cold or hot—to form rapidly on curing strongly adherent, relatively hard, stable, galvanically-protective coatings.

The present invention is also directed to a variety of multiple package coating compositions of exceptional properties. In one of these, one package of the two-package system contains the polyol silicate, while the finely divided zinc is in another package. Either or both of these packages may contain additional ingredients, e.g., the polyol silicate may be dissolved in a solvent and the zinc may contain zinc oxide. In another preferred form of the invention, one package designed to be added to a polyol silicate package, is comprised of finely divided zinc dispersed in an organic solvent, e.g. methyl ethyl ketone, and an acidic zinc salt such as zinc chloride and this package may also contain one or more other fillers such as zinc oxide, silica, zircon, clay, alumina, talc and the like. These ingredients without the elemental zinc, may serve as curing catalyst formulations when combined with silicate-type coating compositions, which may or may not contain elemental zinc. The zinc metal-containing package may be added to the polyol silicate package shortly before use. The compositions of this invention may also contain minor amounts of other ingredients such as organic polymers, e.g. polyvinyl materials, for instance, polyvinyl butyral, inorganic fillers, anti-sag agents, thickening agents, suspending agents and the like.

The present invention is further directed to certain of the polyol silicates which are novel products, and which in the most preferred form, can be employed in single-package, zinc-containing, galvanic coating compositions. By the present invention, I have also devised advantageous ways of making the polyol alkyl silicates which are essentially ester-exchange reaction products of aliphatic ortho silicate and polyhydric alcohol, especially of tetraethyl ortho silicate and ethylene glycol.

I am aware that serious difficulties exist in making and using presently available galvanic coating compositions containing metallic zinc and inorganic silicate binders, and effort expended towards devising products containing an organic silicate binder and metallic zinc is in order to obtain improved coating and protective characteristics. Commercially-available products have not been successful in eliminating the problems inherent to these materials. Such products are disclosed in U.S. Pat. No. 3,056,684, and contain a partially hydrolyzed, tertaethyl orthosilicate as the organic silicate binder. Other galvanic coating compositions have been used on the use of hydrolyzed tetraethoxyethyl silicate as the binder, but the variety of available organic silicate-based galvanic coating compositions is limited. Moreover these conventional hydrolyzed silicate products have limited shelf and pot life, and may not cure rapidly at lower temperatures and humidities, nor under a variety of atmospheric wheather conditions (wet, dry, cold or hot) that may be used for curing compositions of the present invention, and thus the latter are not limited by these serious problems. One purpose of the present invention is, therfore, to provide new fast-curing, stable, easier-to-use galvanic coating compositions containing metallic zinc and polyol silicate reaction products having superior coating and curing characteristics and which provide highly advantageous galvanically-protective coatings when cured on ferrous substrates.

Prior organic silicate coating products have a number of disadvantages, and, in particular, they may not be formulated into rapidly-curing single-package, galvanic coating compositions without severe limitations. Thus, the pot life of some of these silicate products, when mixed with finely divided metallic zinc, is so short, e.g. about 4 hours, that the compositions cannot be marketed or used on a practical basis as a single package. Instead, the user of the product must mix the silicate binder with the metallic zinc more or less at the time the composition is to be applied to the ferrous substrate. In many situations, this is a severe disadvantage to the coatings applicator and he must carefully control the operation to insure that the zinc-containing product is applied quickly as a coating, otherwise it may gel prematurely and cause waste and perhaps even the loss of equipment in which the premature curing action occurs. The products of U.S. Pat. No. 3,056,684 currently marketed are of this type and thus do not permit the formulation of satisfactory zinc-containing, galvanic coating compositions having a pot life of over a few hours.

There is possibly one other single package, zinc-containing composition on the present commercial market, but its properties are quite inferior in making rapidly-curing, hard, adhesive coatings. In any event, the art is in great need of improved organic silicate-metallic zinc products of the single package variety in order that the coatings applicators may have faster curing, harder and more adhesive coatings than those products available, and so that a more appropriate selection can be made to satisfy the ultimate requirements for the coatings in a greater number of given situations.

Heretofore, the most widely used zinc silicate-containing coating compositions employed for the protection of metallic substrate surfaces, have been, to my knowledge, characterized by a hydrolyzed silicate binder having an essential

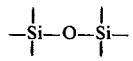

structure. Such previous paint compositions containing substantial amounts of the

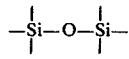

structure, if they are hydrolyzed enough to cure rapidly with zinc dust, are not reliable if requiring long storage, since they tend to form lumps, develop gaseous pressure or form solid gels upon long-aging. Consequently, such prior zinc-silicate coatings had to be blended or mixed at the point of use, due to the necessity of keeping various constituents of the ultimate coating composition in separate containers prior to its application. Where such blending or mixing had to be carried out manually by the operator, it was difficult and sometimes not possible to provide smooth blends free from lumps that would cause clogging of spray equipment if the paint compositions were applied by spraying. Also, the "pot life" of the zinc-silicate materials was often limited to from 2 to 12 hours, and clogging of conduit lines with solid silicate particles presented a real problem, particularly where such lines were exposed to high temperatures, as on the hot decks of ships.

In addition to the necessity of making available separate coating containers in the previous use of silicate coatings, the hydrolyzed alkyl silicate or organosol container, if made of steel, had to be lined with a special, relatively expensive, corrosion-resistant lining, since otherwise the coating composition would gel or become unusable upon extended contact with the iron-containing surface, because of the instability of the composition. In my novel "one-package" system, a simple unlined paint can suffices and is highly satisfactory, without any special coating or lining, for storing my liquid suspension coating compositions. Some of these coating compositions of my invention when properly compounded have a pot life of several days to many years. The longer stable products offer an inorganic zinc composition ready for use right out of the can sold from the shelf of a paint store for use in the home, in preconstruction primers, on ships, in industrial plants or in aerosol cans or drums for spraying. Others of my compositions that may be especially prepared for certain fast-curing applications, may have a pot life of about 1 to 40 weeks or longer and can be made and used before gelling or changing enough to materially reduce their advantageous coating characteristics. Zinc and other filler particulates, whether in the form of finely divided elemental metal, metal oxide or metal silicate, or in the form of zinc silicate, are so difficult to mix into a liquid without lumping that controlled high shear mixing or blending, such as can be practiced in a paint factory, or the like, is far superior to leaving it up to the operator to mix the constituents manually (and usually ineffectively), at the locus of use in the field.

Some of the advantages of my new compositions are that they can be preblended in large batches and made up into single package compositions, ready for instant use for a coating application or they can be activated by adding an accelarator just before using. Additional advantages are that they may be made self-curing, do not freeze, are not subject to bacterial attack, can be used in the form of an aerosol, can be attractively pigmented for high temperature color coatings, and have rapid curing characteristics, making possible painting in winter and painting using automated programmed dipping, spraying and curing cycles, such as the application of a preconstruction primer which may later be welded together for coating rolled steel which is substantially coiled. In addition, the zinc dust-containing coatings provide exceptional rapidly self-curing, galvanic, porous coatings for ferrous surfaces, and can be incorporated into single package or separate package compositions as desired. The single package characteristic makes the coating material ready for instant application by the user who otherwise may be required to stir for days to assure breakup of very fine particulates and remove air, in addition to attaining highly sheered homogeneous and quality-controlled slurries in a larger plant, rather than mixing in small uncontrollable batches at the locus of use.

Because of the exceptional adhesion of these coatings to ferrous substrates they often can be applied even to oily surfaces and over scale and give good protection. This is particularly true with the presence of soluble zinc salts such as zinc chloride which may actually penetrate ferrous scale to give galvanic protection thereunder to steel substrates.

My novel long pot life or single component, stable systems which are one preferred form of the present invention, makes it possible to apply the coating composition by dipping in large tanks, whereas the relatively short pot life of prior zinc silicate coatings precluded any possibility of successfully dipping large objects in the zinc silicate binder because gelling or degradation would occur within a few hours and a new batch of zinc binder had to be provided for continuing the operation. The resulting loss was sufficiently great to prevent the adoption of large scale dip-coating of ferrous objects and surfaces. As indicative of their ease of application, my novel one-package, zinc-silicate paint compositions can be applied by conventional means, including spraying, brushing, rolling or dipping, or by the so-called "airless" spraying technique. Another important benefit of some of my compositions is that they can be formulated with a high boiling solvent to give a product having a flash point of over 100°F.

One of the important benefits of some of my compositions is that they can be packaged in a container, such as an ordinary paint can, and kept therein indefinitely, ready for use at any time as self-sufficient coating compositions requiring no mixing with other compositions or additives. When placed in a moisture and air-tight container, these compositions remain smooth, free from lumps and without any tendency to gel or become objectionably viscous when tightly sealed. Some of my preferred compositions have such properties even when the finely divided zinc component is included to give a composition ready for application to a supporting substrate. When applied and dried, the compositions cure in the presence of air and moisture in a minimum amount of time under evaporative conditions to give relatively hard, strongly adhesive coatings having exceptionally good protective properties toward corrosion and having self-healing properties toward scratches that may be formed on the surface of the coating. This self-healing property is particularly advantageous where the coating is exposed to salt or other corrosive atmospheres. The strong adhesion of the coating to the substrate surface, particularly where applied to non-sandblasted, but otherwise clean, ferrous metal surfaces is especially advantageous where subsequent coatings to be applied do not adhere well to the surface of the substrate itself, such as where certain plastics are to be applied to a surface of a steel, aluminum, glass or ceramic substrate to which such plastics ordinarily do not bond. Thus, the metallic zinc-containing coating compositions of my invention can suitably be used as a primer for application to a substrate to condition the surface thereof for another of the same or other coatings, particularly a coating/of a plastic or polymeric material or an inorganic, ceramic, porous topcoat.

Another advantage of some of my coating materials is that they have exceptional protective properties at high temperatures, such that a finished, dry coating of my composition on a 20-gauge, cold-rolled steel test plate can be heated to red heat and then quenched in cold water without the slightest indication of cracking or decomposition of the coating material. The thermal cycle of high temperature heating and low temperature quenching can be repeated many times without any apparent degradation of the coating. The exceptional heat resistance of my compositions is believed to be due to the driving-off by evaporation on exposure to air and moisture of all organic groups to leave the inorganic grouping —SiO$_2$, ZnO, SiO$_2$—, zinc silicate and possibly zinc oxychloride, which is stable up to red heat temperatures and above, such as 1100° to 1200°F.

Coatings specifically formulated from my preferred glycol alkyl silicates having the

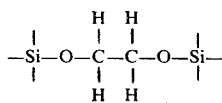

grouping, particularly when methyl ethyl ketone, zinc dust and and acidic zinc salt such as a salt of a mineral acid, e.g. zinc chloride, or mineral acid catalyst are used in the products, exhibit a very strong tenacious adhesion to metal substrates. The protective surface not only provides a decorative gray color, but also enhances the resistance of the metal substrate to oxidation, rusting or other forms of corrosion. The adhesion of the coating to the substrate is so extremely strong as to indicate the possibility of a chemical reaction between the silicate, acidic zinc salt, and ferrous metal-containing substrate. A chemical bond between the coating and the substrate seems most likely in view of the fact that the coating on the substrate successfully withstands bending, impact and thermodegradation.

The organic silicate binders of the products of the present invention are ester-exchange reaction products made from polyol and organic silicate. The silicate reactant reacted with polyol is essentially composed of ortho silicate whose major portion of organic substituents is essentially of aliphatic, including cycloaliphatic, configuration, although a minor amount of non-aliphatic radicals, e.g. aromatic groups may be present. The organic radicals of the essential ortho silicate are generally saturated and each may have up to about 6 carbon atoms, preferably up to 4 carbon atoms. These aliphatic radicals which are attached to a silicon atom through an oxygen atom, consist essentially of carbon and hydrogen, but may, in some instances, contain other elements, such as oxygen as in the case of ether, ester, alcohol or ether-alcohol groups. For example, the silicate reactant may contain ortho silicates in which the organic radicals are in the form of alkyl, hydroxyalkyl, alkoxyalkyl, hydroxyalkoxyalkyl or carboxyalkyl groups attached to a silicon atom through an oxygen atom, and preferably these groups have straight chain or primary structures. At least two of the organic groups per molecule of at least a substantial portion of the essential silicate reactant are ester-exchangeable with the polyol reactant. Also, these aliphatic or alkyl-type silicate reactants may contain one or more siloxane groups, that is,

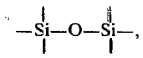

in aliphatic or cyclic configuration. The silicate reactant will often not have more than about 5 to 10 silicon atoms per average molecule, and preferably not more than 2 silicon atoms. If the silicate reactant is hydrolyzed its structure may contain quite a number of the siloxane groupings, and they may be in cyclic configuration. Mixed hydrolyzed silicates may also be a useful reactant. With hydrolyzed silicates the reaction with polyol decreases cure time and this is a particularly important property with silicates that are hydrolyzed below about 75% since these products also have longer shelf-life than higher hydrolyzed products. The siloxane-type structures are considered herein to be ortho silicates, i.e. the four valences of the essential silicon atoms are bonded through oxygen atoms to either carbon or another silicon atom.

The aliphatic ortho silicate reactants employed in making some the binder components of the present invention include those having the formula:

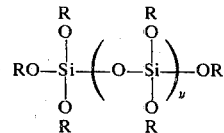

in which the R groups may be similar or dissimilar alkyl-type radicals having up to about 4 or 6 carbon atoms, e.g. alkyl, hydroxyalkyl, alkoxyalkyl, hydroxyalkoxyalkyl, carboxyalkyl and the like, and $y$ is 0 or a number up to about 5 or 6 or more, to provide a siloxane structure. Preferably, $y$ does not exceed 6. The R groups may be the same or different in a given reactant. Also, most of the R groups are not stearically-hindered to the extent that the reaction will not take place. Included among these useful R groups are alkyl of up to, for instance, 4 carbon atoms, e.g., methyl ethyl, propyl and butyl groups. Tetraethyl ortho silicate or mixed esters of ethyl and ethoxyethyl or ethoxymethyl silicate and the like are highly preferred reactants. The R groups may also be alkoxyalkyl or carboxyalkyl radicals of 2 to 4 carbon atoms, such as ethoxyethyl, methoxyethyl, carboxymethyl and the like. Another type of alkyl ortho silicate which may be employed in making my binders are those in which one or more R groups are hydroxyalkyl such as hydroxyethyl, hydroxypropyl, and the like, or R groups in which are contained both ether and alcohol oxygen atoms such as hydroxyethyloxyethyl, and in the case of the latter only minor amounts may be desirable due to the low volatility of this substituent. The ortho silicates which can be employed in preparing the binders of the present invention may contain minor amounts of other ingredients, some or all of which may be of silicate configuration and monomeric or polymeric in form. Thus, a preferred reactant is a tetraethyl ortho silicate containing a small amount, for instance, about 4 to 10% of the dimer having the formula:

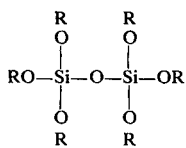

One product of this type which is commercially available is designated "ethyl silicate consdensed," and contains about 90 to 95% of tetraethyl ortho silicate, 4 to 9% of the above dimer in which R is ethyl, and a small amount, say about 1%, of unidentified higher polymers. The ortho silicate reactant may include various monomers and mixed monomers of the alkyl ortho silicate type, having minor amounts of other silicates or silanes, having one or both of carbon-to-silicon or carbon-oxygen-silicon linkages. Materials of these types may include minor amounts of tri- or di-alkoxy silanes containing other radicals attached by a carbon-silicon linkage, as well as polymers of these various materials. Thus, the alkyl ortho silicate may have a co-mixture of an alkyl silicate, such as tetraethyl ortho silicate, and a mono- or di-alkyl or aryl, alkoxy silane, such as propyl trimethoxysilane, to form a product containing the reacted form of such materials. The silicon-carbon bond may increase the water repellancy of the protective coating and offers the possibility of the organic portion of the product having functional groups which may bond to a functional group on a plastic top coat or an antifoulant coating material.

The polyol silicate binders of this invention are essentially reaction products of the above-described ortho silicates with aliphatic, including cycloaliphatic, polyols which are preferably diols or triols. The essential polyol reactant may be partially esterified or otherwise modified providing it has at least 2 free hydroxyl groups per average molecule to participate in the ester-exchange reaction. Other hydroxy-bearing materials may be presen and may or may not ester-exchange with another reactant, e.g. the ortho silicate reactant. Thus the polyol-silicate reaction mixture may contain a monohydroxy reactant such as an alkanol, ether alkanol or the like, and such monohydroxy material may be mixed or ester-exchanged with the polyol silicate during or after the latter is formed. Although the polyol or monohydroxy material may have a molecular weight of up to about 200 to 400 or more, especially if they are polyoxyalkylene polyols, such as the polyoxyalkylene glycols, e.g. polyethylene glycols, or alkyl-capped, polyoxyalkylene polyols, the polyols and monohydroxy materials ofte have molecular weights up to about 100. Higher molecular weight polyols are usually a minor molar amount of the total polyol employed with the lower molecular weight polyol being the major amount. The preferred polyols are ethylene glycol, propylene glycol and glycerol, and ethylene glycol is the most highly preferred polyol reactant from both the product quality and cost standpoints. Although the polyol silicate binders of this invention consist essentially of carbon, hydrogen and oxygen, they may contain other elements such as nitrogen, as is the case when diethanol amine or triethanol amine is employed as a polyol reactant. The nitrogen-containing polyols may be employed along with other polyol in the reaction or these materials may be ester-exchanged sequentially. Other polyols which may be employed in making the binders of the invention include diethylene glycol, trimethylene glycol, triethylene glycol, dipropylene glycol, tripropylene glycol, polyethylene glycols, trimethylol propane, 1,6- or 2,6-hexanediol, neopentyl glycol, 1,3-butylene glycol, pentaerythritol, hexylene glycol, partially-esterified polyols, cyclopentanediol and the like. Mixtures of these polyols may also be reacted, especially those which contain a major portion of ethylene glycol, propylene glycol or glycerol. The choice of polyol may affect the gelling characteristics of the product, for instance, if higher molecular weight polyols are used, proper adjustment to lower ratios of polyol with respect to the silicate reactant on the basis of the number of hydroxyl groups per ester-exchangeable group in the silicate is advisable, and the extent of alcohol removal from the ester-exchange reaction mixture may be increased to obtain a hard, adhesive coating. The use of polyols having more than 3 carbon atoms may lead to slower curing products, especially as the ratio of polyol to silicate increases and thus the use of polyols having up to 3 carbon atoms is preferred. Similarly, the gelling characteristics of the reaction mixture and properties of the coating compositions may be affected, depending upon the choice of the silicate reactant and the extent of

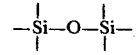

and silicon-carbon bonds that may be present. The use in high ratios to silicate of higher molecular weight glycols or other polyols having other groupings thereon and less volatile, may lead to products which are slow-curing and give soft coatings due to their low volatility. This may indicate the use of only minor molar amounts of these polyols based on the total polyol reacted.

The ester-exchangeable, monohydroxy components which may be ester-exchanged into the polyol silicate reaction products of this invention are monofunctional materials, and they generally have a higher boiling point than the alcohol formed as the result of this ester-exchange. These monohydroxy materials may have a molecular weight up to about 300 or 400 or more, and they often consist essentially of carbon, hydrogen and oxygen. Among these monohydroxy reactants are the alkanols, ether alkanols, keto alkanols and the like having, for instance, up to about 24 carbon atoms, preferably up to about 8 or 12 carbon atoms. Thus materials such as branched alcohols may be used to impart stability to the coatings ultimately formed and in this respect t-butyl alcohol and 2-ethyl-hexyl alcohol may be employed. Among the useful alkoxy alkanols are methoxyethanol, ethyoxyethanol, and the like. Alkyl-terminated ether glycols may also be reacted, e.g. methyl-terminated diethylene glycol, CH$_3$OCH$_2$CH$_2$OCH$_2$CH$_2$OH. The amount of monohydroxy material reacted during the formation of the polyol silicate or subsequently, any range from very small proportions up to amounts sufficient to ester-exchange with essentially all of the ester-exchangeable groups of the polyol silicate. Preferably, the amount of monohydroxy material, if used at all, is sufficient to exhange a major portion of the ester-exchangeable groups on the polyol silicate. The ester-exchange reaction can be conducted under the conditions disclosed herein for forming the polyol silicates of this invention.

In the case of polyol silicates made from siloxane reactants having a plurality of

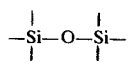

bonds, the presence of substantial amounts of monohydroxy materials in the product or the reaction mixture in which the polyol silicate is formed, can serve to reduce the gelling tendencies of the polyol silicates when metallic zinc is not present, e.g. the polyol silicate package of a multiple package system. This stabilizing effect is particularly apparent when the monohydroxy material is alkoxy alkanol. Preferably, this amount is a molar excess of monohydroxy material based on the ester-exchangeable groups of the polyol silicate. Apparently enen at low temperatures in the presence of an acid catalyst the monohydroxy material ester-exchanges into the polyol silicate structure, and this reaction takes place much more rapidly at elevated temperatures.

The ratio of silicate and polyol reactants employed in making the binders of the present invention may affect the structure and properties of the resultant products, as well as the manner in which they may be used in coating compositions. Generally, the binder reaction products are made by using polyol and silicate in amounts such that the ratio of hydroxyl groups supplied by the polyol is about 0.05 or 0.15 to 1.8 moles per mole of ester-exchangeable group provided by the silicate, preferably this amount is about 0.35 to 1.5:1 or even 1.35 or 0.5 to 0.9:1. These preferred amounts are especially advantageous in making single-package, zinc-containing, galvanic coating compositions. In the case of tetraalkyl silicate and glycol reactants, these amounts may correspond to about 0.3 to 3.5 moles of glycol per mole of tetraalkyl ortho silicate, preferably about 0.7 to 3:1 or even 0.7 to 1.8:1.

Generally, with the presence of siloxane groupings in the molecule of the silicate reactant smaller amounts of polyol may be used to produce coating compositions of desireable curing characteristics. As the number of siloxane groupings increases in the silicate reactant the use of smaller amounts of polyol in the overall range disclosed may be employed and thus especially with hydrolyzed silicates the mole ratio of hydroxyl groups supplied by the polyol to ester-exchangeable groups of the silicate may be as low as about 0.05 mole or somewhat less per mole of ester-exchangeable group in the silicate. Larger amounts may also be used if desired. With monomer-type silicates this ratio may be greater and often is at least about 0.15 or 0.35:1. In any event enough of the polyol is ester-exchanged with the silicate to give a product having improved curing characteristics compared with those of the silicate reactant itself.

I have found that silicon-to-carbon bond containing reactants or silicone polymers can sometimes be usefully incorporated in minor amounts in the novel backbone of my silicate products. Examples of such reactants which may be so incorporated are methyl triethoxy silane, propyl trimethoxy silane, vinyl trimethoxysilane and hydroxy functional silicone polymers. Cross-linking of the silicate product can be effected by attaching a functional organic grouping to the silicon of the silicate product which may then be made to chemically bond to a plastic topcoat containing a reactive grouping. This silicone-organic type of bond imparts water resistance to the coating and may permit attaching functional groupings on the coating which may be further bonded to a substrate or a topcoat which also contains functional reactive groupings.

The following table gives considerable data with regard to the physical form and properties observed, analytical results obtained and postulated chemical structures of products prepared by reacting the aliphatic ortho silicate, specifically tetraethyl ortho silicate, with a glycol reactant, specifically ethylene glycol, under conditions effecting an ester-alcohol exchange with accompanying near total removal by distillation of alcohol released from the reaction mass. This study was conducted to establish the structure of products which are quite useful in this invention. These products were made by removing essentially all alcohol to the point of gelling of the product.

Certain information has been omitted from the table in the interest of conserving space. Such information includes the following: As to the boiling points of the glycol alkyl silicate reaction products of my invention, the mole ratio of glycol to silicate is important. When the ester-exchanged and reacted mole ratio of glycol to tetraalkyl ortho silicate ranges from about 0.5 to below 1 glycol per mole of tetra ortho silicate the resultant products are extremely thermally stable and contain structures having predominately the grouping

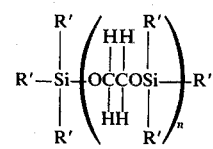

where $n$ is greater than 1 and the R' groupings are alkoxy. If, however, the ratio of glycol to tetraalkyl ortho silicate is above 1 and less than 3.5 moles of glycol per mole silicate, excessive heating and removal of monofunctional compounds gels the resultant polymer possibly through condensation and cyclic rearrangements with release of alcohol from the predominant structure present in this ratio range which must be carefully made so as to not exceed the temperature and degree of alcohol removal where gelling and rearrangement occur. These products may be characterized by the above structure wherein $n$ is usually only 1 or 2 and the R' groupings are both alkoxy and pendant glycol (hydroxyalkyloxy). At ratios of over 4 moles of glycol/1 mole tetraalkyl silicate the structure is

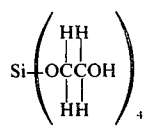

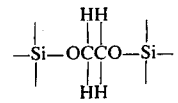

and this material is well-known and distillable under vacuum.

As to the physical forms of my reaction products, they are all colorless and range from non-viscous through viscous, syrupy, semi-solid, but flowable, to semi-solid and non-flowable substances. As to the solubilities of my products as identified in the following table, product No. 1 is soluble in all hydrocarbon solvents and oxygenated organic solvents, but insoluble in water;

No. 2 is soluble in aromatic hydrocarbon solvents; insoluble in paraffinic and naphthenic hydrocarbons, soluble in oxygenated solvents; and insoluble in water;

Nos. 3 through 6 have the same solubilities as No. 2;

No. 7 is insoluble in aromatic hydrocarbon solvents, soluble in ketones and insoluble in water;

No. 8 is insoluble in most organic solvents except hot alcohol and compounds having an active hydrogen.

The following table gives further data as to the same reaction products identified above and in the table as Nos. 1 through 8. As to the products Nos. 1 through 8, the mole ratio of ethylene glycol to tetraethyl ortho silicate is increasing from 0.5 mole glycol/1 mole tetraethyl ortho silicate in No. 1, to 3 moles of glycol/1 mole tetraethyl ortho silicate in No. 8. As the glycol ratio is increased, the structure changes drastically from products having the glycol-alike silicate backbone structure, in which both hydroxyls of essentially all of a given glycol molecule are bonded to different silicon atoms in the ratio os 0.5 to 1 mole glycol per mole silicate, to predominately the pendant-type structure in which only one hydroxyl group of the glycol is bonded to a silicon atom. Glycol alkyl silicate molecules with perhaps only one or two of the

backbone groupings per molecule were formed when there was a mole ratio of 1 mole of tetraethyl ortho silicate to less than 2 moles of glycol, and perhaps less than 1 as the ratio increases from 2 to 3.5 and the products had none of these backbone groups when the mole ratio was over 4 glycols/1 silicate and substantially all alcohol was distilled therefrom. In each instance in making these products, I withdrew only enough alcohol to polymerize the reaction mixture to a very viscous, but not a solid, insoluble, consistency.

It is noted that in the data table, the analysis and structure postulated are based on average composition. It is assumed that a distribution of products occurs having masses higher and lower in molecular weight, but averaging to the given composition, and they are not just a single compound.

TABLE I

| Product No. | Mole Ratio Silicate/ glycol | Refractive Index, 30°C. | Density, 25°C. | Analysis of Product | | | | Molecular wt. | Moles alcohol collected per mole of glycol charged | Postulated Structure ("EtO") stands for —ethoxy— | Proof of Structure |
| | | | | % SiO$_2$ | % C | % O | % H | | | | |
|---|---|---|---|---|---|---|---|---|---|---|---|
| 1 | 1/0.5 | 1.4004 | 1.004 | 31.1 | 43.2 | 32.2 | 8.3 | 386 | 2/1 | (EtO)$_3$—Si—OCCO—Si—(OEt)$_3$ with HH above and HH below | The lack of absorbency peaks (or troughs) in the IR spectrograph in the 2.7 micron region indicates no (OH) group; hence substantially all of the glycol present must be in the backbone in the first two examples herein. Silica content and hydrogen, oxygen and carbon content all support the postulated structure shown, as does also the weight balance; and the IR & NMR data indicate the ratios of backbone to pendant type glycol in my polymer that are shown in the adjoining column. |
| 2 | 1/0.9 | 1.4106 | 1.062 at 29°C. | — | — | — | — | — | 2/1 | (EtO)$_3$—Si—(OCCO—Si—OEt)$_6$ structure | |
| 3 | 1/1 | 1.4115 | 1.075 | 29.9 | — | — | — | — | 1.82/1 | 82% backbone glycol 18% pendant glycol in polymer | |
| 4 | 1/1.2 | — | 1.075 at 29°C. | 28.5 | — | — | — | — | — | Contains both backbone and pendant glycol groupings in polymer | |
| 5 | 1/1.3 | 1.4200 | 1.08 at 29°C. | 28 | — | — | — | — | 1.45/1 | 35% backbone glycol 65% pendant glycol | |
| 6 | 1/1.5 | 1.4190 | 1.09 | 28 | — | — | — | — | 1.35/1 | 35% backbone glycol 65% pendant glycol | |
| 7 | 1/2 | 1.4204 | 1.10 | 25.4 | — | — | — | — | 1.1/1 | Some backbone glycol but predominantly pendant glycol | |

TABLE I-continued

| Product No. | Mole Ratio Silicate/ glycol | Refractive Index, 30°C. | Density, 25°C. | Analysis of Product % SiO$_2$ | % C | % O | % H | Molecular wt. | Moles alcohol collected per mole of glycol charged | Postulated Structure ("EtO") stands for —ethoxy— | Proof of Structure |
|---|---|---|---|---|---|---|---|---|---|---|---|
| 8 | 1/3 | 1.4306 | 1.13 | 20.2 | — | — | — | — | 0.82/1 | Small amount of backbone glycol but predominantly pendant glycol, some free glycol in the product | *For explanation of NMR data, see following. |

*The area underneath the Nuclear Magnetic Resonance (NMR) signal peaks is directly proportional to the type of hydrogens contributing. When the peaks are integrated, one gets the number (or summation) of hydrogen types contributing to peaks relative to others present. When integrated, one obtains a ratio of methylene to methyl to methine type hydrogens. The structure given and the ratio of backbone to pendant glycol in the table of various compositions correlate with the NMR results for the predicted composition based on relative charges, assumed reaction, amount of alcohol recovered during ester-exchange occurring and also where obtained, elemental analysis.

The NMR of the —OH group in the pendant glycols,

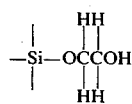

fall in the range of frequencies 3.25 to 3.45 ppm (delta). The —OH peak is absent in the case of backbone glycol type structure

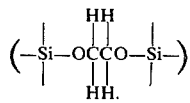

The methylene in both the pendant and backbone glycol resonate in the same frequency region, and therefore cannot be used for differentiation. This is why the —OH is used to identify the pendant from the backbone glycol type. The —OH groups in Reagent Grade Glycol molecule (which is not bonded to the silicon atom) does not fall in this region.

Solutions were in 15% deuterated chloroform and NEAT.

The following structural formula conform to data obtained by study of infrared, elemental and nuclear magnetic resonance analyses of some glycol alkyl silicate products of this invention (similar structures are believed to occur with hydrocarbon ether silicates):

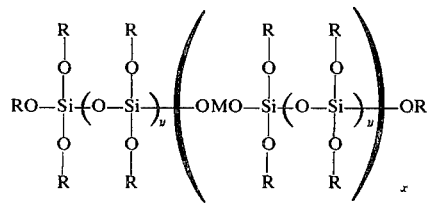

wherein R has the identity described above, $y$ is 0 or a number up to about 5 or 10 or more (although some cyclics may occur at 4 or 5 and higher

groupings) if the silicate has a siloxane structure, $x$ is a number of 1 or greater as indicated by the molecular weight of the product, and M is the glycol reactant minus its two hydroxyl groups. The $x$ in the formula may be zero in some of the product molecules but is usually 1 or greater and on the basis of the average molecule, $x$ decreases as the mole ratio of glycol to aliphatic ortho silicate reactant increases from 0.5 to 1 mole glycol per mole silicate, being greatest at about 1/1 glycol/silicate mole ratio, then decreases as the glycol/silicate ratio increases until at a ratio of about 1.9, $x$ is only about 1 and being ery dependent on how much alcohol is removed from the reaction mass, if any at all, during ester-exchange. Generally, in the ratio of 1 to 2 moles of glycol per mole of silicate, $x$ does seem to be greater than about 10 or even greater than about 5, and is more usually about 1 depending on how much alcohol has been removed. Products that are also intended to be covered by my present invention are those having a minor amount of a compound, or a residue of a compound, having a direct Si atom-to-carbon atom bond in the structure in place of at least one of the RO groups. If a dimer, e.g., $(C_2H_5O)_3$—Si—O—Si—$(OC_2H_5)_3$, is present in the silicate undergoing reaction with a glycol, then a corresponding portion of the product may have the structural formula:

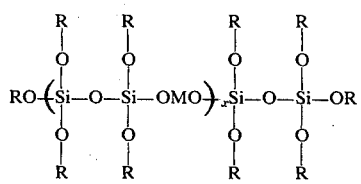

which corresponds to $y$ as defined above being 1. If a trimer be present as a reactant, then a corresponding portion of the product may have the structural formula:

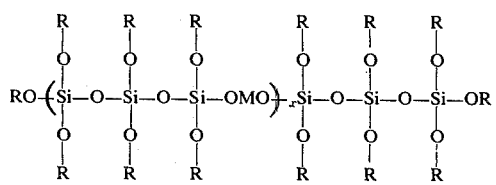

which corresponds to $y$ as defined above being 2. Alkylcapped glycol, along with the polyol, may also be exchanged into the molecule with release of alcohol from the silicate.

The polyol aliphatic silicate binders of the present invention can be made by a liquid phase, ester-exchange reaction between the polyol and the aliphatic ortho silicate, and during the reaction alcohol corresponding to the alcohol of the R group, as defined above, i.e. ROH, is formed. Although the reaction may proceed to an acceptable extent without the removal of the alcohol from the reaction mixture, it is preferred to remove at least some or even a major portion, if not substantially all, of the alcohol formed, and if a single package product is desired it is preferable to remove a major portion of the alcohol formed. The alcohol can be removed by distillation after the reaction or during the reaction where the polyol reactant has a higher boiling point than the alcohol formed.

The extent of the alcohol removal from the reaction mixture may affect the molecular weight of the product since this removal can permit the reaction to proceed. Generally, the ester-exchange is not allowed to be conducted to the extent that a solvent-insoluble product is obtained, since this would make the polyol ortho silicate product virtually useless in coating compositions. It is preferred that the reaction be stopped before the product is substantially gelled, to the point of insolubility although if gellation has not proceeded too far, the viscosity of the product may be reduced by the addition and reaction, e.g. by chain-termination, of alcohol back into the product. An example of this type of reaction is as follows:

where R is as described above and R'' is, for instance, alkyl, say of 1 to 6 carbon atoms or a high silicon polymer which will not cause gelling of the paint.

The ester-exchange reaction employed to make the binders of this invention generally takes place at elevated temperatures, for instance, about 50° or 80° to 150° or 160°C., preferably about 90° to 130°C. The use of an ester-exchange catalyst may be necessary to obtain the desired reaction, and a relatively strongly acidic catalyst, for instance, having a dissociation constant at 25°C. of at least about 0.001, such as sulfuric acid or hydrochloric acid, is highly preferred for the silicate-polyol reaction, especially when the latter does not contain nitrogen. In some instances, a separate catalyst may not be necessary, for example, when the polyol reactant contains a nitrogen atom, e.g. as with diethanol amine or triethanol amine, or another material present in the reaction mixture exerts a catalytic effect. For instance, if the reaction mixture contains a material having a carbon-silicon bond, e.g., alkyl trialkoxy silane, the reaction may proceed adequately in the

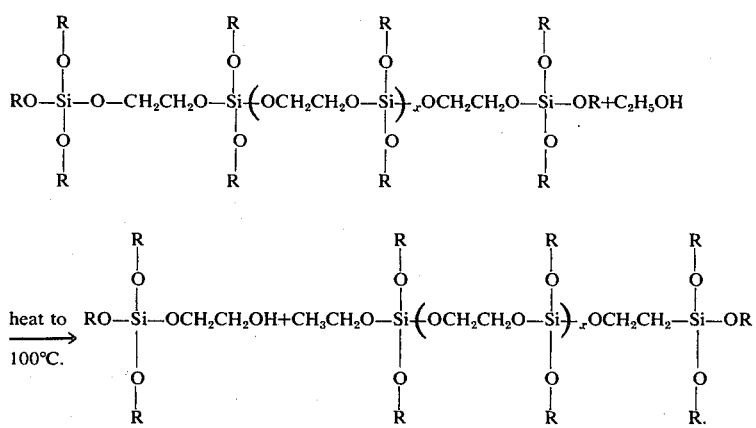

If excessive alcohol is present, the entire structure may be broken down. The reaction occurs more slowly at lower temperatures. The binder resulting from excess alcohol addition has far inferior properties in zinc-silicate coatings. Alkoxy alkanols as solvents are highly preferable to alcohols and it is highly advisable to have a minimum of low molecular weight alcohol in the binder as solvent both from a standpoint of flash point and cure rate of the zinc film. The presence of the alkoxy alkanol may counteract any undesirable result due to any alkanol in the product.

When an alkoxy alkyl silane is present in the reactants, the silicate products of the invention may contain a corresponding portion of Si-C bonding. Thus, if trialkoxy alkyl silane, $(RO)_3SiR''$, is present, the product may have the silicate grouping:

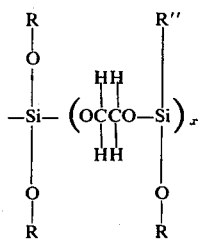

absence of a separate catalyst, although the product is superior as a coating when acid is present. Other materials that may provide a catalytic effect are compounds which may participate in the ester-exchange reaction such as the alkyl titanates, e.g. butyl titanate or alkyl borates, but their use may not be advisable. The ester-exchange reaction system and the product may be essentially anhydrous, at least to the extent that insufficient water is present to cause the product to gel or cure to an essentially solvent-insoluble material. The presence of small amounts of water may not be unduly deleterious and may lead to partial hydrolysis of the product in situ. The polyol ortho silicate binder reaction products of this invention, exhibit substantial, and preferably essentially complete, solubility in, solvents, for instance, methyl ethyl ketone, and in some areas the products may react with this solvent on standing.

The polyol ortho silicate binder reaction products of the present invention may be made by other procedures, and these include an ester-exchange system involving the reaction of the ortho silicate, e.g. tetraalkyl ortho silicate, tetraalkoxyalkyl silicate mixtures thereof or tetra ortho silicates having both alkyl and alkoxy alkyl groups attached to the same silicon atom, with a larger amount of the polyol, for instance, by using a ratio of greater than 1.8, especially greater than 2 moles of hydroxyl group supplied by the polyol per mole of ester-exchangeable group in the ortho silicate reactant. This reaction produces a material which can be designated a silicon tetraglycollate, i.e. Si(OMOH)$_4$ wherein M is the residue of the glycol. This intermediate can then be reacted with additional tetraalkyl or tetraalkoxyalkyl silicate to provide the polyol silicate reaction product of this invention. These reactions can be illustrated in simplified form as follows:

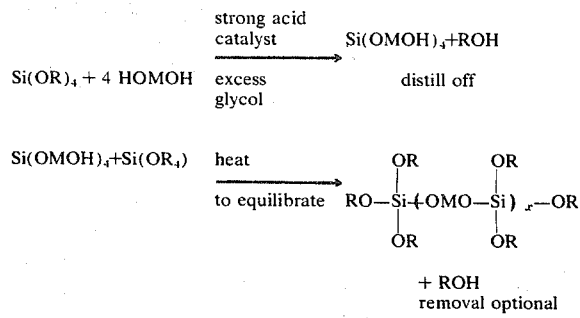

wherein R is alkyl or alkoxyalky of, say, up to about 4 or 6 carbon atoms, M is the glycol minus its 2 hydroxy groups, and $x$ is 1 or more. The overall ratio of polyol to ortho silicate reactants supplied to this system can be controlled by the amount of the reactants in the second reaction and to supply the desired ratio of polyol to ortho silicate as herein designated for making the reaction products of this invention. There can also be incorporated in the second reaction a variety of other reactants, e.g. polysilicates or silicone monomers and polymers, to make products useful in coatings. Also various other reactants such as monohydroxy materials and polyols having at least 2 functional hydroxy groups per molecule of the types mentioned herein, can be present in the second reaction providing the overall ratio of polyol, monohydroxy reactant and ortho silicates are in the ratios set forth herein for my desired binder products. Generally, in the second reaction the amount of the ortho silicate, (RO)$_4$Si, reacted provides about 0.2 to 11 moles of ester-exchangeable group, RO, per mole of functional hydroxy group in the intermediate, Si(OMOH)$_4$, and preferably this amount is about 0.3 to 5:1 or even about 0.3 or 1.1 to 3:1. In performing this type of synthesis, it can be advantageous to conduct the initial reaction of ortho silicate with excess polyol while removing by distillation alcohol formed in the reaction, and continuing this separation until the reaction mixture is in an essentially semi-solid condition. Then, the additional ortho silicate can be added and reacted, preferably with further removal of alcohol by distillation, to prepare binder products of the present invention. These ester-exchange reactions can be conducted under the conditions disclosed herein for this type of reaction.

The ester-exchange reaction by which my polyol silicate binder products are made, can be conducted in the absence of the addition of separate or extraneous solvent, although I prefer that at least some solvent be present before the reaction is completed in order to lower the viscosity of the product during the latter stages of the reaction, and to facilitate its handling. The polyol silicate binder is usually the bottoms or residual material in the reaction vessel at the conclusion of the ester-exchange, and all or a portion of any organic solvent added to the system may also be in the bottoms. When a solvent is employed during a reaction, it may often be present in amounts from about 5 to 400, preferably about 25 to 300, weight percent, based on the polyol silicate reaction product formed. The solvent may also be added to dilute the reaction product after the ester-exchange is complete, and this addition may be used alternatively or in conjunction with the addition of solvent before or during the reaction. Regardless of the time and manner of adding the solvent, it is advantageous to prepare a solvent solution of the polyol silicate binder for further handling or usage. Frequently, these solutions contain at least about 0.1 weight part of solvent per part of polyol silicate, and preferably about 0.5 to 10 weight parts of solvent per part of polyol silicate, including as solvent any alcohol present in the composition. While it is in some instances preferable to remove some of even substantially all of the alcohol formed in the ester-exchange reaction, removal of alcohol ether, e.g. alkoxy alkanol, formed in the ester-exchange is not as significant and its presence may be advantageous when alkanol is present.

The organic solvents which can be included in the polyol silicate reaction products of this invention, either before, during or after the reaction, include the normally liquid organic solvents which are essentially inert to objectionable reaction with the polyol silicate binder reaction products and metallic zinc if the latter component is to be included in the composition for extended periods of time as in the single package systems. Thus, the solvent component can be essentially one which dissolves the polyol silicate in the presence of zinc dust and will not in the time the composition is stored before being applied as a coating, cause significant deterioration of the coating or excessive gassing due to the presence of metallic zinc. The problems are minimized and less important when two-component systems are used. The solvents are essentially anhydrous, at least to the extent that they do not cause undesirable gelling or severe gassing of the polyol silicate reaction product through reaction with any water present. Among the useful solvents are ketones, e.g., the methyl ketones, especially those other than acetone which may react with zinc or zinc chloride or oxide if present; hydrocarbons such as aromatic hydrocarbon-containing solvents; glycol ethers; ethers; alcohols; ether alcohols; keto alcohols; esters; and other essentially non-reactive solvents composed essentially of carbon and hydrogen and with or without one or both of oxygen and nitrogen. Alkanols may undesireably react with the polyol silicate if the amount of alkanol present is sufficiently large. Mixtures of the various solvents may also be employed and examples of suitable solvents are xylene, toluene, naphtha methylethyl ketone, methylisobutyl ketone, cyclohexane, 2-ethoxyethanol, 2-methoxyethanol, ethanol, t-butyl alcohol, isopropanol, and the like. It may be advantageous in this invention to use solvents composed to a subtantial extent, e.g. at least about 10 weight %, of alkoxyalkanol or methyl ketone. For instance in the case of polyol silicate binder compositions in which metallic zinc is not present, the alkoxyalkanol solvent can be used with advantage as a stabilizer and preferably is a major molar amount based on the total moles of ester-exchangeable groups on the polyol silicate plus the moles of monohydroxy solvent present. In compositions containing the polyol silicate and zinc the solvent may be composed of a sufficient amount of methyl ketone other than acetone, e.g. methyl ethyl ketone, to stabilize the polyol silicate against gelling and such amounts are often at least about 10 or at least about 25 weight percent of the total solvent. The methyl ketone solvents are very susceptible to reaction and gelling with the polyol silicates of this invention having high ratios of polyol/silicate if the pH is not buffered, as for instance with a neutral talc such as magnesium silicate, or with added zinc dust which changes the pH enough to prevent the exothermic reaction between the polyol silicate and methyl ketones. The solvent component may have a boiling point below about 200°C., preferably below about 140°C., and may also have a Kauri-Butanol value (ASTM D1133) of over about 50, preferably over about 60. For single package formulations in which the solvent, polyol silicate reaction product and zinc dust are in contact for long periods of time the solvent may also have a dielectric constant of less than about 18, preferably up to about 14. For two-package formulations this property is not important and glycol ethers, alcohols and solvents of higher dielectric constant can be employed.

It has been discovered that in order to produce harder coatings from compositions in which the polyol silicate binder has alkoxyalkyl groups, the solvent present should have a more rapid rate of evaporaation than the bonded groupings on the silicon atoms of the silicate. For instance, if the groupings on the silicate are ethoxyethyl then the major portioin of solvent or diluent should preferably be one that evaporates more rapidly than 2-ethoxyethanol if a less porous, stronger film is desired. The solvent should evaporate before the coating cures, and if the solvent is present when the coating cures the cured coating will be softer and more porous and have less strength and less abrasion resistance.

The galvanic protective coating compositions of the invention are comprised essentially of the polyol silicate binder and finely divided metallic zinc. The metallic zinc may be elemental zinc or a zinc alloy higher than iron in the electromotive series of metals. These finely divided materials may be referred to as dust and often they may have particle sizes below about 50 microns, but for some compositions courser particles may be used. The zinc component is galvanically-active and often contains at least about 85 or 90 weight % zinc with or without a small amount of zinc oxide. The galvanic protective coating compositions contain a sufficient amount of metallic zinc to provide a galvanic effect when the coating composition is cured on a ferrous substrate. The amount of metallic zinc may be at least about 1 weight %, often at least about 40 weight %, and preferably about 50 to 98 %, based on the total weight of the polyol silicate reaction product and metallic zinc. Often this amount is at least about 85 weight %, but not so high that the composition is not suitable for its intended use. These galvanic protective compositions may also contain an organic solvent, e.g. of the types and in the amounts described above, and preferred compositions of the invention contain a solvent in an amount to provide a coating formulation of satisfactory viscosity considering the other ingredients present and the contemplated use for the composition.

My coating compositions containing the polyol silicate binder reaction product may have inorganic fillers, as well as various other components added to provide beneficial effects. Thus, the composition may contain one or more essentially organic solvent-insoluble components, and these materials are often naturally-occurring or synthetic mineral materials in finely divided form. The fillers may be, for instance, oxygen-containing forms of various metals, incuding silica, or the oxides or silicates of aluminum, zirconium, zinc, tin, magnesium, chromium, titanium, and mixtures of such materials. The naturally-occurring minerals may be of the acidic, basic or neutral or amphoteric types. The preferred materials include one or more of talc, silica, zinc oxide and clays. The amounts of these inorganic fillers that may be included in the compositions of this invention are not so great that an unduly deleterious result is obtained, for instance, they should not in single-package compositions cause undesirable gelling or gassing of the composition. Moisture in the filler is not desirable in single-package compositions. The gelling and gassing effects have been observed where excessive amounts of moisture or hydrated minerals or calcium, zinc or magnesium hydroxides have been included instead of the hydrous oxides. Often, the amount of the inorganic filler other than metallic zinc, which may be included in the compositions is about 0.1 to 500 weight percent, preferably about 1 to 90 weight percent, based on the polyol silicate present, and depending on the filler type, absorption and ultimate use. The total amount of metallic zinc based on the total of the inorganic fillers and zinc in the galvanic coating composition may be as little as about 10 weight percent or less, but is preferably more than about 50 percent where a good galvanic coating is important.

It may be advantageous to include zinc oxide in some of the compositions of the present invention since, in relatively small amounts, it accelerates the curing and hardening of the coatings containing other fillers, particularly coatings with relatively small amounts of zinc. The zinc oxide can be included in the two-package, zinc dust compositions, for instance, those containing the polyol silicate in solution in an organic solvent in one package, and zinc dust and zinc oxide in the other package, with or without a solvent such as methyl ethyl ketone. Preferred intermediate packages containing zinc or polyol silicate may also contain a curing catalyst, for instance, of the type discussed herein. The zinc oxide may be in the polyol silicate package. The amount of zinc oxide in the compositions may be a minor proportion sufficient to enhance the curing properties when the composition is cured as a coating on a substrate. Finely divided metallic zinc may have zinc oxide formed on its surface. It may be further advantageous to include in my compositions a total amount of zinc oxide of, for instance, about 1 to 50 weight percent, preferably about 3 to 10 weight percent, based on the zinc employed. The zinc oxide is preferably essentially anhydrous, e.g. essentially zinc hydroxide free, especially in the absence of a ketone solvent.

The coating compositions of this invention may also contain a curing catalyst in a minor amount sufficient to increase the rate of curing when the compositions are applied and cured as coatings on a suitable substrate, and exposed to moisture, for instance, that in the atmosphere. These catalysts may, with advantage, be acidic, and these include acids such as hydrochloric acid, sulfuric acid, fatty acids, e.g. acetic or hexoic acids, or acidic salts of metals such as zinc or magnesium. For instance, one may use the acid salts of zinc such as zinc chloride, zinc acetate, zinc octoate and mixtures of the acids and acidic salts. Other catalysts or coating hardeners may be employed and include compounds which may react with the zinc dust and binder during curing, e.g. chlorinated compounds such as $CCl_4$. The curing catalysts may be added to the polyol silicate composition at the time desired, and may be included in the liquid organic solvent solution of the binder before metallic zinc is added, or along with the zinc or other fillers. These compositions also preferably contain an inorganic filler, especially neutral magnesium silicate, and the intermediate formulations may be marketed without including metallic zinc, and may be carefully buffered, and may later be combined with metallic zinc to form galvanic coating compositions. Thus, a particularly attractive marketable product may contain the polyol silicate binder, organic solvent and curing catalyst, with or without a filler, especially magnesium silicate. The amount of curing catalyst which may be included in these various compositions is often about 0.00001 to 50 weight %, preferably about 0.001 to 10 weight %, based on the polyol silicate. When curing catalysts are present with the filler and binder, the filler should not be present in amounts, considering its extent of hydration, that may cause slow gelling of the binder before use. This is particularly true with hydrated talcs, clays and the like. Curing catalyst compositions may be made containing a normally liquid ketone solvent such as methyl ethyl ketone, a minor amount of acidic zinc salt and a sufficient amount of zinc oxide which will enhance the curing of the coating in which the catalyst is used.

Curing of the film containing polyol silicate reaction product and zinc dust containing fillers may occur without any added curing accelerator or hardener; however, it may be advisable to accelerate the cure and to improve the hardness where abrasion of the coating may occur, such as on decks of ships and steel-coated walkways. Improved hardness and faster cures may be obtained by using catalysts which may cause more rapid reaction of the silicate or silicate products of curing and the zinc dust or filler by deposition of the silica between the packed zinc dust and filler particles in a more adhesive form. Generally, the deposition of and/or reaction of the adehsive silicate with the zinc dust should occur after most of the solvent evaporates to allow better packing of the zinc particles and a harder film.

In two-package systems, the catalyst or accelerator may be added to either package, depending on which it is most compatible. The catalyst or accelerator may change from an inactive catalyst to an active one when the film containing it is exposed to moisture during curing, yet remain inactive with the anhydrous binder and/or zinc dust or filler. Such is true with esters of acids which hydrolyze on exposure of the film to moisture in the air, or compounds which, on addition of the zinc dust, are released to form catalysts which accelerate hardening. In other cases, the accelerator, such as zinc oxide, either on the zinc particles or separately added to the composition, may, when mixed with the polyol silicate binder, upset the equilibrium by pH change and produce silicate structures which cure the coating more rapidly.

In other cases, two or more compounds may contribute as accelerators for curing and hardening, such as, for instance, magnesium silicate and zinc chloride or zinc chloride and methyl ethyl ketone together, and may each be added to the most compatible package for stability. A great variety of hardening agents are known, such as (minor amounts, e.g. about 0.0001 to 1% based on the polyol silicate binder) acids, anhydrides, hydrolyzable esters of acids, minor amounts of lead and copper components, etc.

In other cases, chloride compounds such as hydrochloric acid, $CCl_4$ or zinc chloride may enter into a reaction with the ZnO on the surface of the zinc dust to give a zinc oxychloride bond in-situ with the silicate-zinc bond and deposition of adhesive silica all contributing to form a harder coating. The uses of accelerators and hardeners need not be limited to the above reactions and the actual reaction mechanism of the polyol silicate with zinc dust to cure as a galvanic protective film is unknown, and its great advantage in forming easier-to-use paints producing superior zinc silicate bonded zinc dust films was totally unexpected.

The polyol ortho silicate products of the present invention can be used to make multiple package coating compositions of exceptional properties. Thus, one package or component may contain as its essential ingredient the polyol ortho silicate, and this component is designed to be mixed with another package containing finely divided zinc as its essential ingredient. These packages are mixed to form a galvanically-protective coating composition at or near the time the composite is to be applied to a ferrous metal or ferrous metal scale covered supporting substrate or otherwise used and cured. The polyol ortho silicate in the first package can be made from the various ratios of polyol to ortho silicate as designated above, and the multiple package form of the invention is useful over the broad range of polyol to ortho silicate ratios disclosed herein. The polyol ortho silicate reaction product may be made with or without the removal of alcohol during or after the ester-exchange reaction, and any alcohol present in the product may not be disadvantageous, even when finely-divided zinc is added. Glycol ethers can be used as cosolvents and tend to esterify into the compositions on standing and give less volatile and higher flash point compositions having a longer shelf-life. Also, the resulting coatings are harder than those in which the solvent is an alkanol. In the case of the multiple package coating compositions, the separate packages are often combined shortly before use, and extended storage of the mixture is usually not contemplated. In these situations, the instability of the mixed product due to the conjoint presence of alcohol and zinc may not be disadvantageous.

The first component of the multiple package system often contains polyol ortho silicate dissolved in a solvent which may be or include the alcohol formed in the ester-exchange reaction or any excess polyol reactant, but the solvent portion of the component may advantageously be composed to a substantial, and preferably to a major, extent of an added or extraneous organic solvent of the types described herein. These solutions contain sufficient solvents so that they can be readily handled, and often the amount of solvent is 0 to about 400 wt. %, preferably about 25 to 200 wt. %, based on the silica content of the polyol ortho silicate binder. The amount employed may be affected by the binder composition and its silica content. The polyol ortho silicate component or the finely divided zinc component of the multiple package systems may also contain other ingredients such as inorganic fillers of the types described above, paticularly one or more of zinc oxide, talc, zircon and silica, and curing catalysts, as well as both of these types of materials. The components of the package may contain minor amounts of suspending agents, anti-sag agents, or thickening agents such as polyvinyl butyral.

In another form of the invention, particularly useful in automatic coating during which a near instant cure is required, a combination of finely divided zinc, suspending agent or agents, anti-sag agents, curing catalyst, e.g., acidic zinc salt such as one or both of zinc chloride and zinc acetate or the like, a minor amount of a thickening agent, e.g. polyvinyl butyral, and an organic solvent of the types described herein, preferably a ketone, e.g. methyl ethyl ketone, with or without aromatic-containing hydrocarbon, may serve as one component of the package. The materials may form a relatively non-settling, non-gassing, non-gelling slurry or dispersion which is stable for months or years and is ready for immediate use upon mixing with the other package. The other component of the package contains the polyol ortho silicate, preferably dissolved in an organic solvent, e.g. just enough to make the composition liquid. When the packages are mixed, they may be useful for several days or weeks and when a longer pot life is ncessary, the mixture may be reactivated by adding more of the polyol silicate component to prevent gelling. Either of the packages may contain inorganic fillers as additional ingredients, and particularly useful are one or more of zinc oxide, talc, and silica, but preferably the fillers are put in the polyol silicate package. Zinc oxide is preferably in the package containing the finely divided zinc, and the zinc oxide utlimately serves to give a faster curing coating. The component containing the finely divided zinc often has this ingredient in major amounts based on the total zinc and filler component, while the curing catalyst is a minor component dissolved in the solvent. Frequently, the solvent to finely divided zinc ratio is about 1 weight part solvent to about 1 to 15 weight parts of zinc. Also, the curing catalyst, e.g. zinc chloride, may be included as a minor ingredient in the solvent-zinc slurry component, e.g. about 0.0001 to 15 weight % based on the zinc, or about 0.0003 to 1 weight % of the polyol silicate in the other component.

In the products of the present invention, the amounts of their various components and their chemical nature may affect the characteristics of coatings obtained from these compositions and, for instance, control over the ratio of polyol silicate to metallic zinc and any other particulate fillers present may be significant in producing compositions which cure quickly to hard, strongly adherent coatings. If an inappropriate amount of an ingredient is included, the resulting coating may be objectionably soft, and the proper total ratio of metallic zinc, and any other particulate filler, to the polyol silicate reaction product that is employed may depend on the particulate size of the metallic zinc or other filler and thus upon the surface areas of these materials. Zinc oxide, whether added as such or present on the surface of the metallic zinc, apparently reacts to some extent with any chlorine compounds present and with the polyol silicate binder or the curing catalyst to enhance the contact of the solvent and the polyol silicate with the surface of the metallic zinc, thereby causing faster hardening of the coating. Some fillers apparently reduce the degradation of the metallic zinc, particularly if the filler is neutral and does not contain a metal which will build an electric chemical reaction with the zinc, causing its degradation. The galvanic life of the coating may increase by the provision of greater amounts of metallic zinc in the compositions. At relatively low levels of zinc and considerable other filler, increases in the amount of curing catalyst such as zinc chloride or other acidic salts may provide more conductive coatings having greater galvanic activity. In addition, substantial amounts of zinc chloride in the coatings may penetrate iron scale so that galvanic protection over the scale is obtained.

Other objects, features, and advantages of the invention herein disclosed will be readily apparent from the following description of certain embodiments in the following examples, but variations and modifications of the invention may be effected without departing from the spirit and scope of the novel concepts presented.

The invention will be further illustrated by the following specific examples in which, if not indicated otherwise, the percentages are on a weight basis.

EXAMPLE I

| POLYMER-FORMING REACTANTS | MOLES | PARTS BY WEIGHT |
|---|---|---|
| BINDER | | |
| Tetraethyl orthosilicate (containing less than 3% dimer and polymer) | 4.8 | 1000 |
| Ethylene Glycol | 7.25 | 450 |
| CATALYST | | |
| Sulfuric Acid (98% H$_2$SO$_4$) | | 1 to 3 drops |
| LIQUID VEHICLE FOR BINDER | | |
| Methyl Ethyl Ketone Solvent (Mixed with equal weight of above binder) | | 200 |
| INORGANIC MATERIAL | | |
| Zinc Dust | | 500 |
| Zinc Chloride | | 2 |
| Talc (Sierra Mistron Monomix) | | 100 |

1000 grams of substantially anhydrous tetraethyl orthosilicate, containing less than 3% by weight of a dimer plus polymer, together with 450 grams of ethylene glycol are mixed together in a suitable reaction vessel equipped with heating means, a stirrer and a condensing head having a take-off for condenser. The mixture is heated to a temperature of about 100°–110°C. and 1 to 3 drops of sulfuric acid (98% H$_2$SO$_4$) are added.

During the first few minutes after the sulfuric acid addition, the mixture in the reaction vessel turns yellow, but clears up toward the end of a 3-minute period. Ester-exchanged alcohol starts distilling off overhead. The rate of such distillation is controlled so as to regulate the rate of reaction and to prevent overheating. Evaporation of the liquid in the reaction vessel tends to cool the liquid. Consequently, control of the rate of distillation controls to some extent the temperature of the reaction mass. The amount of alcohol removed and collected controls the polymer mass viscosity and structure.

Distillation may be carried out at atmospheric or subatmospheric pressure to remove the last traces of free alcohol. Collection of the condensed alcohol (and any other condensed distillate) is continued until 425 to 450 grams of alcohol have been distilled and collected. At about this point, the reaction mass in the vessel exhibits a tendency to gel or become objectionably viscous, due to excessive polymerization reaction. The mass may be diluted with a solvent such as toluene to form an azeotropic mixture and remove more alcohol therefrom at a lower temperature. Heating is thereupon discontinued and a small proportion of toluene, in the neighborhood of 200 ml. is added to cool the reaction mass and dissolve the polymer that has formed as a result of the polymerization reaction between the silicate and the glycol. Upon thinning the reaction mass with toluene, the resulting solution was removed from the reactor. After the reaction was run and weight balances obtained, it was noted that the glycol used was found to have about 1% by weight of water, which apparently did not cause any problems with the product or reaction.

A weight balance shows the following:

|  | PARTS BY WEIGHT |
|---|---|
| Overhead |  |
| Alcohol | 456 |
| Toluene | 176 |
| Recovered Solution | 1126 |
| Polymer product | 953 |
| Toluene | 173 |
| Lost |  |
| Solids (in bottom of reactor) | 41 |

Overhead total: 632

The recovered polymer solution had the following characteristics and constituents:

| Viscosity | 8 cps. |
|---|---|
| Odor | toluene only |
| Silica (Equivalent on SiO₂ basis) | 24.8% |
| Liquid (colorless) | 75.2% |
| Active polymer product | 84.7% |
| Toluene | 15.3% |

After the cooled solution had been removed from the reactor, 100 parts by weight of such solution, referred to as "OP4" were used to make up a mixture containing zinc and having the following composition:

| OP4 | 100 |
|---|---|
| Zinc chloride (Zn Cl₂ Anhydrous) | 2 |
| Methyl ethyl ketone (MEK) | 100 |
| Zinc Dust | 500 |
| Talc ( a platy magnesium silicate) | 100 |

As to procedure, the OP4, MEK and zinc chloride are mixed thoroughly and the zinc dust added to the resulting mixture in a high shear blender. The pigment suspension so obtained is applied to a ferrous metal surface, for example, by brushing the suspension onto a cold-rolled nonsandblasted steel panel. The suspension is easily applied and not lumpy, and after 10 minutes gives a very hard, strongly adhering coating. After drying for a further 15 minutes, the coating upon being tested for water and oil solubility is found unaffected by both. Upon top coating the surface of the coated panel with a high-build vinyl coating, excellent adhesion is exhibited. The coated and scored panel also shows excellent resistance to salt corrosion when exposed to a spray of a 5% salt solution at 95°F., even after long aging.

The coating, which is from 2 to 3 mils in thickness when dry, shows an absence of cracking, good adhesion by the cross-hatch test, no loss of adhesion from one-sixteenth inch knife scores, and good heat resistance. There is substantially no loss of adhesion or of toughness when the coating is heated for brief periods to 1100°F., although prolonged heating at 1100°F. shows that oxidation of the coating takes place.

A bending test shows no loss in adhesion when bent 90° and only a slight loss when bent through 180°. An impact test shows superior results by comparison with other known zinc silicate coatings.

The reactions that take place in carrying out the method of the foregoing example, wherein the polymer is substantially non-hydrolyzed and anhydrous conditions are maintained, lead to the formation of a polymer portion having the novel "backbone" structure represented by the grouping

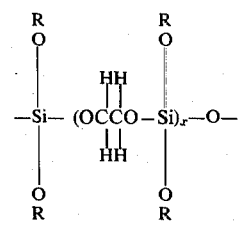

wherein R is ethyl or hydroxyethyl (pendant glycol) and $x$ is 1 or a higher number.

EXAMPLE II 2500 grams of ethyl silicate "condensed", containing 95.5% of tetraethylorthosilicate monomer, 4% dimer and 0.5% trimer and some higher polymers, are mixed with 1120 grams of ethylene glycol in a 5 liter flask equipped with a pot thermometer and a reflux thermometer, stirrer, and short receiver. An immiscible dispersion occurs on stirring this mixture, but upon heating the mixture with continued stirring to about 105°C. (pot temperature) and upon adding as catalyst 3 drops of concentrated sulfuric acid (98% H₂SO₄), the mixture shortly clears up and within a few minutes, ethyl alcohol starts distilling off. A total of 1125 grams of ethyl alcohol is collected up to the point when the contents of the vessel started to thicken noticeably. The contents of the vessel are then cooled and 100 grams of xylene are added. The resultant liquid product is stable and active as a binder.

The binder so prepared is hereinafter designated as "Silicate No. 1." It remains stable and active as a binder for a period of at least 6 months, and probably much longer.

EXAMPLE III 500 grams of Silicate No. 1 are mixed with 500 grams of methylethyl ketone and 2 grams of zinc chloride, together with 2500 grams of zinc dust (Federated HE zinc dust) and 200 grams of dried talc powder (Sierra Neutral platy talc) and the resulting mixture is thoroughly blended with a high shear blender, such as a Waring "Blendor." The resultant product when stored in a 1 gallon sealed can and kept therein over a 6-month period remains stable and useful as a highly adhesive galvanic coating, without any noticeable change upon aging over this length of time. The resulting paint is hereinafter called "Paint 1a."

EXAMPLE IV

Paint 1a is used in a system for continuously and automatically dip-coating cleaned steel parts. For this purpose, the parts are placed in a wire mesh screen container, and after being dipped in Paint 1a are removed and the excessive paint liquid thrown off centrifugally while at the same time spreading the coating evenly over the surfaces of the parts undergoing treatment, especially in and about any tubular holes and adjacent areas. The parts so coated are then dumped into a pointed wire screen to minimize contact between the wet painted surfaces and the supporting surfaces of the screen. Rapid drying of the coating takes place upon agitation of the screen-supported parts in circulated warm, moist air under a hood. The coatings cure in just a few minutes.

Thereafter, upon testing the coated parts for thickness, hardness, immersion in a variety of solvents, adhesion when exposed to salt fog (5% salt at 95°F.) and outdoor exposure, the following test results are obtained:

| | |
|---|---|
| Thickness of coating | 1.5 mils (average) |
| Hardness (pencil) | 4H |
| Adhesion by cross-hatch method | Excellent |
| Brittleness (bend) | Not brittle |
| Heating to 750°F. for 4 hours | No effect |
| Heating to 1100°F. for 1 minute and dashing into cold water | No effect |
| Solubility in boiling water | None noticeable |
| Solubility in boiling xylene | None noticeable |
| Solubility in hot lube oil at 300°F. | No effect |
| Outdoor exposure, 45° tilt to south | No rust after 6 months |
| Salt fog (5% salt - 95°F.) | No rust after 2000 hours |
| Solubility in boiling salt water | None noticeable |
| Hot water immersion | No effect. |

When the paint is sealed in a can and kept over a 6-month period, no pressure builds up. The paint is easily dispersed and the tests noted above upon being repeated at the end of the 6-month period give identical results to those obtained by tests on the fresh paint. No differences of any significance and no degradation of the paint are ascertainable during a 2000 hour aging period.

In a similar evaluation when the glycol alkyl silicate binder described was diluted with an equal volume of xylene instead of the methyl ketone and 2½ wt. parts of zinc dust added per part of diluted binder, the resultant paint was kept in perfect useful condition for a period of 1½ years. The coatings from this binder were excellent providing a hard, quick curing and adhesive and highly protective coating for steel.

When the glycol alkyl silicate binder was diluted with an equal volume of a high flash aromatic solvent and 2½ parts of zinc dust and one-half wt. part of a platy silica flour (Noviculite) and one three-thousandths of one part of triethyl amine added to the mix and applied as a coating on a clean steel substrate, the coating dried rapidly, was adhesive and protective. (Pencil hardness 3H — Salt spray 5% salt 95° F. — greater than 3000 hours — no rust). This paint mix was kept for 1½ years and found to be non-gassing as a coating and did not settle to a hard layer on the bottom.

EXAMPLE V

In preparing a paint designated as "Paint 1b", 500 grams of the glycol alkyl silicate binder from Silicate No. 1 are mixed with 500 grams mesityloxide, 4 grams of zinc chloride, 2500 grams of zinc dust and 200 grams of talc, employing a high shear blender to effect thorough blending and mixing. Tests identical to those made in Example IV indicated that excellent coatings are obtained with nearly identical properties to those obtained in the testing of Paint 1a.

EXAMPLE VI 500 grams of the glycol alkyl silicate binder designated previously as Silicate No. 1 are mixed with 500 grams of methylisobutyl ketone, 2 grams of zinc chloride, 2500 grams of zinc dust and 200 grams of talc. Upon being tested in an identical manner to the tests above recited, the coating composition designated as "Paint 1c" gives identical results except that the coating produced therefrom is somewhat softer, but it passes all of the tests to which Paint 1a was subjected.

EXAMPLE VII 500 grams of Silicate No. 1 are mixed with 500 grams of xylene, 2500 grams of zinc dust and 50 grams of neutral talc. The resulting coating from the coating composition, designated as "Paint 1d", passes all of the tests described above, but the resulting coating is somewhat softer and less adhesive than the coating from the application of Paint 1a.

EXAMPLE VIII 500 grams of the glycol alkyl silicate binder, Silicate No. 1, are mixed with 50 grams of methylethyl ketone and 450 grams of xylene, together with 2500 grams of zinc dust, 10 grams of bentonite, and 60 grams of talc. Four grams of zinc chloride are added and the mix is subjected to high shear mixing in a Waring Blendor. The resulting paint, here designated as Paint No. 13, appears to be a little softer than Paint No. 1a, but equal to the latter in all other respects.

In order to provide a harder coating than, for instance Paint 1a, various forms of finely divided silica, such as Cabosil, a finely divided pyrogenic silica aerogel, can be added in an amount equal to about 5 grams to the other ingredients of Example III, or a still harder coating is obtainable by adding 100 grams of Minusil of an average particle size equal to 5 microns.

EXAMPLE IX 2500 grams of ethyl silicate "condensed" and 1125 grams of ethylene glycol are heated to 110°C., and 5 drops of toluene sulfonic acid dropped in to catalyze the esteralcohol exchange. Alcohol is distilled off as in Example II until 830 grams of ethanol have been removed. The removal of the alcohol is stopped before a high polymer is produced. The residual mixture in the reaction vessel, which is termed "Silicate Binder No.

2", produces a somewhat softer and less adhesive coating, but all of the coatings pass the test heretofore set forth.

EXAMPLE X 950 grams of ethyl silicate condensed 450 grams of ethylene glycol and 100 grams of propyl trimethoxy silane are heated to 105°C., and two drops of concentrated sulfuric acid added as catalyst. The mixture clears up with the volatilization of alcohol. After a total of 480 grams of alcohol have been removed, the colorless viscous liquid remaining in the reaction vessel is made into a series of paints in the same proportions as in Example III, but in smaller quantities. Identical testing procedures give similar results to those shown in Example IV, but all of the resulting coatings are harder and superior to those obtained from Paint 1a, as in Example IV.

In the paint produced in accordance with this Example, the backbone is believed to contain some

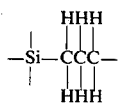

bonds in addition to the

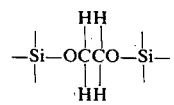

bonds that are present in all of the coatings of my invention as exemplified in my foregoing examples.

EXAMPLE XI 1200 grams of ethyl silicate condensed and 670 grams of propylene glycol, with 2 drops of concentrated sulfuric acid to catalyze the ester-alcohol exchange, are mixed and heated, as in Example I, to 110°C. 637 grams of alcohol are removed before further polymerization is stopped by cooling the residual mass. The resulting mass is very viscous. Paints made from this viscous binder designated "Silicate Binder No. 4", but using smaller quantities of the binder than shown in Example II for Silicate No. 1, give coatings that are harder and slightly less adhesive but satisfactorily passing all tests.

Aerosol cans (200 ml. capacity) are filled with 30 ml. of Silicate Binder No. 4, 60 ml. of Freon 11 and 60 ml. of Freon 12, with steel bolt as an agitator to permit adequate mixing upon being shaken. These cans in a sealed state kept their contents in good condition, ready for use in touch-up galvanizing of surfaces.

EXAMPLE XII

Any of the foregoing paints is suitable for application as a thin primer coating upon steel parts that are to be formed into prefabricated structures by welding, since the primer coating permits welding right through the coating. After being welded, as in the erection of a building from such prefabricated structures, the erected structure is recoated with a thicker coat of the same zinc silicate coating composition.

It is feasible to carry these operations out in an automated production line upon cleaned and sand or shot blasted structural pieces, which are then dried and either stored for erection later on or are erected immediately, or are topcoated with a thicker coat of the same zinc silicate coating composition, without the need for removing any rust that may have formed. In the welding operation, the zinc silicate coat is converted into the wholly inorganic silicate — ZnO, SiO, which exhibits no "burnback" in automatic welding tests and is not detrimental to the strength and other properties of the weld when the coat has a dry thickness of less than three-quarter mil.

EXAMPLE XIII

To the glycol alkyl silicate polymer as produced, e.g. in Example I, prior to adding any solvent, there are introduced into the reaction vessel 200 grams of 2-ethoxy ethanol and heating is continued until 120 grams of additional ethyl alcohol are driven off and collected. At this point, the contents of the vessel start to thicken, the heating is stopped and the reaction mass cooled by the addition thereto of 50 ml. of xylene. The resultant product containing a mixture of glycol, ethyl, and ethoxyethyl silicate polymers is diluted with an equal volume of methylethyl ketone and 0.25% by weight of the mixture of zinc chloride added. 200 grams of the resulting liquid mass are mixed under high shearing action with 500 grams of zinc dust of from 0.5 to 10 microns maximum dimension and .50 grams of fine platy talc. The resultant mix was stable in a paint can for months without developing appreciable gas pressure and without hardening or thickening. Where applied as a coating on a clean steel panel, the coating cures rapidly to a hardness overnight of 4H. Adherence is excellent.

EXAMPLE XIV 250 g. of polyglycol (200 mol. wt.) and 145 g. of tetramethyl orthosilicate were heated together to a temperature of 95°C. and one drop of concentrated sulfuric acid (98%) was added. As a result of ester exchange, 60 g. of alcohol were distilled off and recovered. The bottoms solidified in the flask to a rubbery gel, but were dissolved upon the addition of hot xylene with stirring. The resulting binder was suitable for use in a ceramic coating.

EXAMPLE XV 1350 g. of sodium methylate, 1300 g. of silicon in finely divided form, and 4500 g. of methyl alcohol were slurried together in a large flask equipped with a condenser. At a pot temperature of 80°–90°C., vigorous evolution of hydrogen occurred. The distillate was collected in a second reaction vessel and each 100 g. thereof was reacted with 27.2 g. glycol, using one-fourth drop of sulfuric acid as catalyst. Methyl alcohol was distilled off from the second reaction vessel and circulated back to the initial flask containing the finely divided silicon. The methyl alcohol removal was stopped prior to gelling. Periodically, more silicon and methanol were added as they were used up. Otherwise, the reaction was a continuous one to produce as the product glycol methyl silicate or glycol silicate, the ratio of glycol to effluent from the second vessel determining whether glycol methyl silicate or glycol silicate was produced. The distillate from the first reactor contained a compound having about 20% by weight of silica. The final effluent had about 32% by weight of silica.

The bottoms were recovered and diluted with MEK, weight for weight, to provide a binder solution suitable for use in zinc dust coatings.

EXAMPLE XVI

In this example, a novel glycol silicate binder is prepared by an equilibration reaction between (1) the product of a glycol alkyl silicate in which the pendant groups are predominately glycol residues; and (2) condensed ethyl silicate.

In the first step of making the glycol silicate, the starting materials are:

2805 g. ethyl silicate condensed (containing 95% tetraethyl ortho silicate monomer and 5% dimer)
3340 g. ethylene glycol.

These materials were mixed and heated to 110°C. in a 3-neck flask equipped with a thermometer, stirrer, a short column, take-off condenser and receiver. Two small drops of sulfuric acid were added and the mix cleared up as alcohol started coming off. A total of 2480 g. of alcohol was collected. The residue remaining in the flask was recovered as a very thick semi-solid "bottoms" and was thought to contain predominately tetra glycol silicate.

To 7.2 oz. (0.78 moles) of this bottoms product (tetra glycol orthosilicate) were added 8.8 oz. (1.2 moles) of ethyl silicate condensed in a small round bottom 3-neck flask equipped as above. Upon the addition of one-half drop of concentrated (98%) sulfuric acid to the reaction mass when heated to 110°C., the mix immediately cleared up and alcohol started distilling off. 67 g. of alcohol were collected before the bottoms started to polymerize to a nearly solid condition. Prior to complete solidification, the polymerization reaction was stopped and the bottoms utilized in making zinc dust coatings by dilution of the bottoms with an equal volume of methyl isobutyl ketone (MIBK). The incorporation into one part of the diluted binder solution of 2.5 parts by weight of zinc dust of a particle size substantially within the range of from about 2 to 10 microns, and 0.001 part by weight of zinc chloride provides a zinc-containing coating composition that gives galvanic protection to ferrous substrates. There may also be added to the composition 2.5 parts by weight of alumina ($Al_2O_3$) of −325 mesh particle size and the product is a galvanic coating composition.

EXAMPLE XVII

The equation for the reaction is as follows:

$$Si(OEt)_4 + 3HOCH_2CH_2\overset{H}{N}CH_2CH_2OH$$

$$\rightarrow (RO)_3Si\text{-}(OCH_2CH_2\overset{H}{N}CH_2CH_2OSi)_x(OR)_3$$

wherein R is an ethyl group and x is an integer of 1 or higher. Also, there is some product present having both hydroxyl groups on the alkanol amine attached to the same silicon atom as follows:

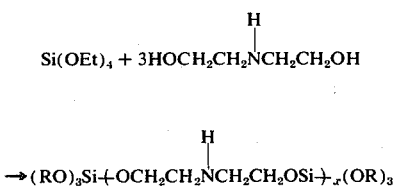

In carrying out this reaction:

150 g. of diethanolamine and 230 g. of tetraethyl orthosilicate were charged into a 500 ml. flask equipped as previously recited herein. Upon heating the charge to 110°C., the reaction started without the addition of any catalyst, and the reaction was continued until the reaction mass started to solidify, at which point the heating and removal of alcohol were stopped. Prior to stopping, 113 g. of alcohol had been removed and recovered. Since this amount of alcohol was equivalent to 2.46 moles, and since 1.43 moles of diethanolamine and 1.1 moles of ethyl silicate had been charged, the logical conclusion was that nearly all of the diol is incorporated into the backbone grouping shown in the above equation. This would indicate a much higher ratio of ethanolamine went into the backbone structure than was ever obtained when glycol was used as the reactant that furnished the (OH) groups. It is surmised that in addition to the bridge compound formed by the diol between two silicon atoms, some product containing the alkanol amine diol with both hydroxyls bonded to the same silicon atom occurred.

Of the residue left in the reaction flask, which is here termed the bottoms product, 25 g. were mixed with 25 g. of MEK and 170 g. of zinc dust (Fed. HE Superfine) and the resulting dispersion was applied to a panel of cold rolled steel. After being dried in 2 minutes, the coating was cured in 1 hour.

EXAMPLE XVIII

To 300 g. of the product, Product No. 2 of the Table I above, were added 490 g. of butyl alcohol and the product heated to 110°C. Ethyl alcohol was distilled therefrom 300 g. of distillate had been collected, at which point the reaction mass was cooled. The binder solution so obtained had a flash point of over 100°F. by the Pinsky Martin closed cup method. When compounded with zinc dust and ceramic fillers, the products made good protective coatings.

EXAMPLE XIX

To 300 g. of the product, Item No. 2 of the Table above, were added 30 g. of dibutyl tin oxide and 30 g. methyl triethoxy silane. The resulting mixture was heated to 110°C. and a small amount of ethyl alcohol distilled therefrom. The resultant product was useful in zinc dust coating formulations, particularly useful when antifoulant type coatings are required such as for the outside of ship hulls.

EXAMPLE XX 200 g. of tetraglycol silicate made as in Example XVI were blended with 200 g. of a partially hydrolyzed ethyl-silicate binder which was prepared as follows: 473 g. anhydrous ethyl alcohol and 143 g. condensed ethyl silicate (28% silica) were mixed and heated to 65°C. and a solution of 0.14 g. hydrochloric acid (37%) in 9.7 g. water added to the above slowly over a 1 hour period.

25 g. of the above hydrolyzed binder were mixed with 25 g. of tetraglycol silicate (made as in Example XVI and 70 g. zinc dust (Fed. HE Superfine Zinc Dust) added. The above resultant paint was applied to a sandblasted steel panel as a 2½ mil film. The coating cured rapidly to a satisfactory coating, but was not nearly as adhesive or hard as my non-hydrolyzed glycol alkyl silicate coatings in a ketone solvent and was not as stable in a one-package formulation.

EXAMPLE XXI 61 g. of ethyleneglycol and 300 g. of tetra 2-ethoxy ethyl silicate were heated to 130°C. and one drop of concentrated sulfuric acid added thereto. 137 g. of 2-ethoxy ethanol were distilled therefrom. The resultant bottoms product was blended with an equal volume of methyl isoamyl ketone and a coating formulation tested as follows:

1 part blended bottoms and ketone mixture
0.003 part zinc chloride
2.8 parts zinc dust.

The above formulation was applied to a clean steel test panel. The coating cured rapidly and gave good protection. The flash point of the paint (Pensky-Martin Closed Cup) was over 100°F. This paint, because of its high flash point, is more useful in painting in enclosed confined areas.

EXAMPLE XXII 99.5 g. trimethylol propane and 385 g. tetraethyl orthosilicate were heated to 120°C. and one drop sulfuric acid added. A very vigorous reaction ensued: After the alcohol was removed by distillation, the bottoms was cooled and diluted with methyl isoamyl ketone and tested with zinc dust as a paint, and was found to give a passable coating.

EXAMPLE XXIII 184 ml. ethyl silicate condensed and 100 g. triethanolamine were heated to 120°C. Alcohol started coming off at 145°C. 98 ml. of alcohol were removed. Upon continued heating, a total of 165 ml. ethyl alcohol were removed. The bottoms was dissolved in an equal volume of methyl isobutyl ketone and tested with 2½ parts of zinc dust and 0.002 parts of zinc acetate in a coating. The coating dried slowly to a hard zinc silicate type coating with good protective properties.

The structure of the triethanolamine (TEA) silicate is much more complex than is the glycol alkyl silicate polymer. The TEA alkyl silicate is probably a polymer containing the bridge between two molecules and other compounds contained therein, such as:

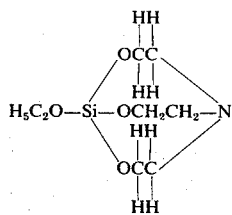

and mixed compounds depending on the degree of reaction and alcohol removal as well as the ratio of TEA and alkyl silicate. The coatings from zinc dust and TEA alkyl silicate are generally inferior in hardness, adhesion and protective value than the more adhesive glycol alkyl silicate polymers.

EXAMPLE XXIV

In a 5 liter, 3-necked, round bottom pyrex glass flask, equipped with a stirrer, 2 plate column, distillation head, receiver, and condenser, were charged 3500 g. ethyl silicate condensed (containing 4% dimer and 1% of higher polymers, and 95% tetraethyl ortho silicate) and 520 g. of anhydrous ethylene glycol and heated while stirring to 110°C. and 1 drop of concentrated sulfuric acid added. Alcohol released by the ester-exchange reactions was distilled and collected to yield 772 g. ethyl alcohol and a bottoms product that was a colorless liquid.

It was noted that this composition would not gel on further heating to 160°C. as is the case when ratios of glycol to silicate are between 1 and 4 moles of glycol per mole of silicate which always gel if the alcohol released is removed to the point where the molecular mass is excessively high. The range of 0.1 to 0.9 moles of glycol per mole of silicate, and the range when excess glycol is present over the 4 moles of glycol per mole of silicate will not gel on heating to 160°C. no matter how much alcohol is removed. It is advantageous to take these important facts into consideration in designing a plant to make the glycol alkyl silicate polymer without the possibility of gelling up the reactor.

The product bottoms from above were found to contain no free hydroxyl groupings by infrared and NMR analysis indicated the strong possibility of bridge compounds. The product was found to be a mixed distribution of glycol ethyl silicate polymers with some unreacted tetra ethyl ortho silicate with the average distribution of

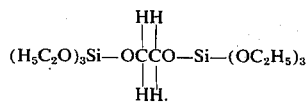

This product and similar bridged polyethanol amine silicate products and tertiary butyl polyol silicate ester exchange reaction products are particularly useful as cross-linking agents for silicone hydroxy functional fluids such as the 2000 viscosity polymethyl siloxane functional OH fluids used for making silicone rubbers and resins. The cross-linking reaction may be accelerated by heat, or the addition of a catalyst such as trace amounts of dibutyl tin dilaurate, zinc octoate, cobalt naphthenate, trimethyl borate, or iron octoate or an acid compound such as dibutyl phosphite or acetic acid, and similar compounds. The polymer rubber or resin so produced is useful in coatings, as adhesion promoters, caulks, sealants, etc. The optimum ratio of the above silicate product to functional fluid depends on the degree of functionality of the silicone hydroxy fluid and the ultimate application. Uses include the treatment of glass and metal, and plastic and wood substrates so that plastics having reactive groupings with the glycol alkyl silicate-silicone polymer may be bonded more adequately to it. Ranges of from about 1 to 70% mole glycol alkyl silicate polymer based on the silicone functional fluid are useful.

EXAMPLE XXV

This example demonstrates the preparation of tetra glycol silicate in an excess of glycol by heating condensed ethyl silicate and glycol together to 110°C., adding a drop of sulfuric acid catalyst, removing all the alcohol ester exchanged and then adding more condensed ethyl silicate to form by transesterification and equilibration and the desired glycol ethyl silicate polymer with removal by distillation of alcohol formed.

The apparatus was the same as described in Example XXIV. Charge: 2 lbs. 6.4 oz. ethylene glycol and 1 lb.

9.6 oz. ethyl silicate condensed (contg. 95% monomer the remainder being mostly dimer). Heated above charge to 115°C., added 2 drops of concentrated sulfuric acid and distilled off 820 ml. ethyl alcohol. 3.78 lbs. of ethyl silicate condensed were then added and 4 drops of concentrated HCl, as catalyst was added. The alcohol released through ester exchange was distilled from the mix to the point of solidification and then a charge weight of xylene equivalent in mass to the bottoms was added to dilute the product into a usable binder. The solution was a non-viscous pale straw liquid. When mixed with 1 to 4 parts by weight of zinc dust and applied as a coating, to a steel substrate, the paint coating cured to dry to touch in 8 min. and cured to insolubility in organic solvents or water in 2½ hours. The coating did not mudcrack up to 30 mils.

To another part portion of the xylene solution of the binder was added one-fourth part of high flash VM and P naphtha and 2.5 wt. parts of a 50:50 blend of noviculite and zinc dust and applied to a clean steel substrate and tested in salt spray application. After 2000 hours, the 3 mil. coating which had been scored was perfect in all respects, and the scored portion was completely filled in with zinc hydroxide products. This shows the galvanic and protective action of this coating, even with the low zinc content. A silicone rubber topcoat was applied over a portion of the zinc dust silicate primer described above. The coating combination in salt spray testing was highly superior.

In another experiment, 1 wt. part of an alumina (Alcoa T61 325 mesh and finer) particulate was added to one-third weight part of the above binder. This coating was pigmented with a small amount of TiO$_2$ and applied over the zinc silicate coating to provide a permanent attractive white porous, blister free coating even after 3000 hours in the salt spray. In another test, 5% of red iron oxide was added to the alumina to give an attractive reddish colored topcoat with excellent protective qualities.

To another part portion of the xylene solution of the binder was added 0.001 part of triethyl amine, 2½ wt. parts of fine zinc dust (HE Superfine) and the mix blended in a Waring Blendor. The paint was kept in suspension for a period of 1½ years, yet when applied as a 2 mil. coating over steel, it cured rapidly to a hard, protective galvanic coating which cured dry to touch in 10 min., dry hard and water and solvent insoluble in 2 hours and withstood more than 3000 hours in the salt spray test.

To another part portion of the xylene solution of the binder was added 1 wt. part of zinc dust and 1 wt. part of Noviculite mineral −325 mesh silica flour. The paint was kept in suspension for several months and reapplied as a topcoat over a zinc silicate substrate and found to cure hard and have excellent protective properties in atmospheric exposure and salt spray. Another portion of this paint was applied to a clean steel substrate and found to perform excellently in all the above respects and tests.

To another part portion of the xylene solution of the binder was added 2 wt. parts of Novacite (Noviculite mineral flour) and applied as a coating over a zinc silicate primer over a steel substrate. The top coat was porous, never blistered after 3000 hours in the salt spray and appeared as perfect as freshly applied.

To another part portion of the xylene solution of the binder was added 2 wt. parts of Novacite (325 mesh and finer flour) and one-tenth weight part of a 50% solution of TiO$_2$ ball milled dispersion in isopropyl alcohol. This coating was nearly bright white and very attractive. It gave excellent protection to a dull colored zinc silicate substrate even after 2000 hours in the salt spray (5% salt, 95°F.) and remained as perfect as originally put in. The coating was hard, adhesive, yet porous, and attractive. A silicone rubber topcoat was applied on the above topcoat to provide a shiny glossy white surface coating combination, which was also water repellent as well.

EXAMPLE XXVI

This example illustrates a continuous process for making glycol alkyl silicate polymer from silicon metal powder as base. The following equations demonstrate the sequence of the reactions involved:

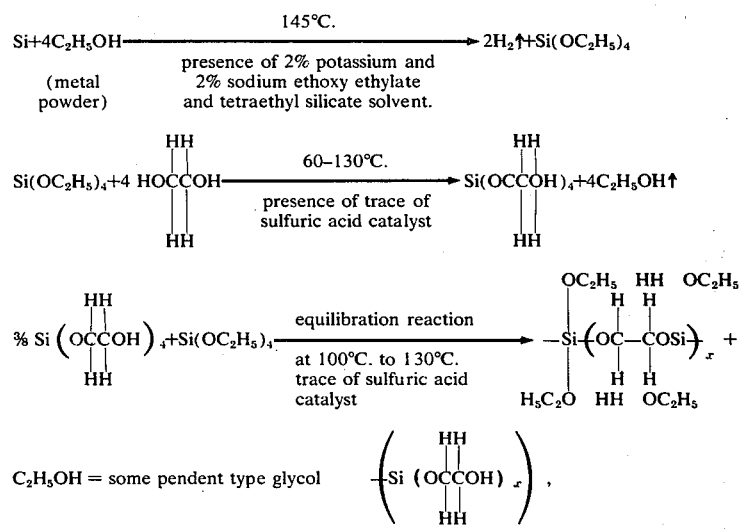

bonded into the polymer. The sodium and potassium ethoxy ethylate catalyst was prepared under anhydrous conditions by the addition of alkali metal to the glycol ether. Reactor A is a pyrex glass 1 liter round bottom, 3-neck flask equipped with a heater, thermometer and controller, mantle, glass stirrer and paddle with attached 10 theoretical plate packed distillation column with take-off receiver and return and a hydrogen gas vent on the reactor, receiver beyond the condenser. Also attached is a charging flask (B) of a slurry of 1 gram mole of silicon metal powder, which has been ball milled for 10 hours to reduce particle size, in 4 moles of anhydrous ethyl alcohol and the slurry kept homogeneous by a stirrer and attached to an inlet tube for continuous addition of the silicon-alcohol slurry to Reactor A at the same rate the product and unreacted alcohol are distilled from the reaction zone. A thermometer and temperature controller carefully control the temperature of the reacting zone of the flask. The charge to reactor A was 24 g. of Na metal, 6 g. K metal, 130 g. ethoxy ethyl alcohol and 200 g. tetra ethyl ortho silicate. The contents are heated while stirring slowly to 195°C. and the silicon metal alcohol slurry from B charging flask, charged steadily to reactor A at the same rate the tetraethyl silicate and unreacted alcohol is fractionally distilled therefrom. The evolution of hydrogen through the cold condenser served to remove the unreacted alcohol and product. By continually fractionating the TEOS from the alcohol and recharging the unreacted alcohol with more alcohol as it is used along with the Si metal in the slurry, a continuous automatic equilibrium balance is attained with the resultant preparation of about 1½ pounds of ethyl silicate product per day. The mixed alkyl silicate product was then reacted as in the second equation with ethylene glycol while fractionating all the alcohol removed by inter ester exchange, 2 drops of concentrated sulfuric acid added at 100°C. to start the ester exchange and alcohol removal. This was carried out continuously.

In the next step a ratio of three-eighth mole equivalent of the tetraglycol silicate containing excess glycol was passed into the next reactor and 1 mole of ethyl silicate heated to 100°C. to effect an equilibration reaction in the presence of a trace of catalyst, the glycol alkyl silicate product being the bottoms after continually fractionating off the ethanol, so produced by the equilibration ester exchange reactions. The product was useful in zinc silicate primer formulations.

EXAMPLE XXVII

To the reaction flask and apparatus described in Example XXIV was added 1800 gms. ethyl silicate condensed (containing 95% tetra ethyl ortho silicate and 5% of higher silicate polymers) and 780 g. of ethylene glycol and 100 g. of diethanol amine. No acid catalyst was added or was necessary for the ester exchange occurring between 120 and 145°C. pot temperature. 940 g. of alcohol was removed, at which point the mix separated into two layers and neither layer was found usable in a coating. The bottom layer was insoluble in either xylene or methyl ethyl ketone. However, in an identical run, the alcohol removal was stopped just prior to separation and the product found useful as a binder in zinc silicate coatings.

EXAMPLE XXVIII

In this example, Example XXV was repeated with the change that in the second step of equilibration ethyl silicate 40 (a siloxane silicate polymer averaging 5 Si per molecule) was substituted for the condensed ethyl silicate. Eight pounds of the ethyl silicate 40 were used instead of the 3.78 lbs. of ethyl silicate condensed, to make a copolymer of glycol alkyl polysiloxane silicate. The product after removing the alcohol and diluting as in Example XXV was evaluated and found to give commendable zinc silicate coatings and had good pot life properties in the single package.

A combination inorganic zinc silicate and an organic epoxy zinc coating were prepared by the addition of varying amounts of the novel glycol alkyl silicate polymer to the epoxy zinc paint (Epon Resin 1001). The curing produced a commendable coating of the mixed inorganic variety. The coating had good adhesion.

EXAMPLE XXIX

A mixed ester silicate was prepared by heating to 110°C. in the presence of a trace of sulfuric acid catalyst, 2 moles of methyl cellosolve and 1 mole of condensed ethyl silicate and the ethyl alcohol removed therefrom by distillation to yield the mixed ethyl, methoxy ethyl silicate. One mole of this mixed ester was reacted with one mole of ethylene glycol in the presence of a trace of sulfuric acid catalyst at 100° to 130°C. with the release and removal by distillation of the ethyl alcohol to form the polymer "methoxy-ethyl glycol silicate." Alcohol removal was stopped just prior to gellation of the bottoms product and the product dissolved in a high flash aromatic containing naphtha (1 part product to one-half by weight of naphtha). For each part of diluted bottoms, 2 weight parts of zinc dust and 0.01 weight part of Cabosil M5 and one-fourth weight part of −325 mesh kaolin was added and mixed on a high shear blender to form a homogeneous paint. The paint was test applied to the inside of a steel salt storage receptacle for softening water. The paint dried overnight before the brine was added. The receptacle was examined 1½ years after coating and found to be rust free. The dry thickness of the film, which was brush applied was between 1 and 4 mils. The paint itself had a high flash point (closed cup over 95°F.).

EXAMPLE XXX

A mixed ethyl and Cellosolve silicate was prepared by heating in the presence of a trace of sulfuric acid 3 moles of Cellosolve (2-ethoxy ethanol) with one mole of tetraethyl ortho silicate and ethyl alcohol was released by ester exchange and removed by distillation therefrom. One mole of this mixed ester and 0.4 mole of tetraglycol silicate prepared essentially as in Example XXVI were heated to 110°C. in the presence of 1 drop of sulfuric acid catalyst, and the remaining alcohol, released by ester exchange, was removed by distillation, and prior to gelling, alcohol removal was stopped and the product bottoms was diluted with one-half its weight of high flash naphtha (aromatic containing) and for each part of this solution was added 1½ parts of zinc dust and one-half part of talc, blending in a high shear mixer. The homogeneous paint resulting was test applied to a steel basement sewage sump, spraying to a dry thickness of 3 mils and allowing to dry 1 day before use. After 1½ years, the coating was perfect with no rust, while an uncoated overflow sump next to the coated one, and having been exposed to the same corrosive conditions, had completely corroded. The paint had a Pensky Martin Flash point of 106°F. and was particularly suitable for coating in inside areas where vapor toxicity and flash danger are problems.

EXAMPLE XXXI

Two pound moles of anhydrous ethylene glycol were reacted with one pound mole of tetraethyl ortho silicate by heating to 75°C. in the presence of 2 drops of sulfuric acid. An ester exchange reaction took place and the alcohol formed was not removed from the reaction mixture. The product solution cleared in a few minutes, was cooled, and had the following properties: wt. % silica, 18.0; Gravity at 25°C., 0.99; Viscosity at 25°C., 7.5 cps. The reaction product was a white, colorless liquid with the odor of alcohol. This binder was tested for suitability in zinc dust coatings right after making, by mixing 1 wt. part of the binder solution with three weight parts of zinc dust. The resultant coating composition was applied at 3 mil (wet) to a clean, steel panel and dried to a 2 mil firm, adhesive and hard coating drying to touch in 10 minutes, to handle in 20 minutes, and to hard and insoluble in acetone in 1 hour. The pot life of the zinc-containing composition was several days; however, when the composition was placed in a container and sealed, gassing occurred and the slurry gelled solid in about 2 weeks. The binder solution without the zinc, was tested at 4 month intervals for a period of 2½ years and found to be active and gave a good coating using the same formulation with zinc during this period. The binder deteriorated very little over this period. Fillers such as "Cabosil" (trademark), silica, zinc oxide, clay, asbestos or talc were also used with the zinc dust in similar formulations with satisfactory results.

EXAMPLE XXXII

Three pound moles of ethylene glycol were reacted by ester exchange with one pound mole of tetraethyl ortho silicate by heating to 80°C. in the presence of 2 drops of 66° Be Sulfuric acid, whereupon the solution cleared up. No alcohol was removed from the reaction. The product was cooled and analyzed: Wt. % silica, 14.9; Gravity at 25°C., 1.02; Color, water white and clear; Odor, ethyl alcohol; Viscosity at 25°C., 8 cps.; Solubility, miscible with an equal volume of xylene — but if zinc dust was added, 2 layers formed. This binder solution was aged for 2½ years while testing a sample every 4 months for stability and was found to be stable during this time.

Zinc formulations using this binder were tested periodically. The formulations included as filler zinc dust or zinc dust and zinc oxide in a ratio of one wt. part binder solution to 2½ to 5 wt. parts of filler. In each case, coatings were applied to clean, steel surfaces at a 3 mil. wet film thickness, and the coatings dried to touch in about 10 minutes, becoming soft at first, but hardening well in over 2 hours to form a galvanic coating for the steel which had long lasting protection for the steel surface, when exposed for 2½ years outside. In each case, however, the product always gassed in sealed containers and gelled in several days. The following table gives these formulations:

EXAMPLE XXXIII

To make the binder, 1 pound mole of tetra-2-ethoxy ethyl silicate $Si(OCH_2CH_2OCH_2CH_3)_4$ (Gravity at 25°C., 1.015; Mole wt., 384; $SiO_2$, 15.7%) was heated with 2 moles of ethylene glycol to 75°C. and 3 drops of 66° Be sulfuric acid added. An ester intercharge reaction took place and the product cleared to a colorless solution. The solution was cooled and analyzed. 11.8 wt. % silica and a flash point (Tag closed cup) of over 100°C. This binder was found to be stable for 2½ years, checking each 4 months in a zinc dust formulation using a ratio of 10 wt. parts of binder solution to 30 wt. parts of zinc dust. The coatings dried to touch in about 10 minutes, and were hard and ready to topcoat in about 1 hour. These coatings applied to steel panels were tested 4000 hours in salt fog, and found to be satisfactory when they were applied at 2½ mil. or greater. Outside exposure of the coated steel for 2 years showed the coatings gave complete protection, even in scored areas. The binder could not be made into a single package zinc composition; however, since it always gassed on long standing and finally gelled, when the binder annd zinc were together. Various fillers, suspending agents and anti-sag agents were tried in these compositions, all being compatible and used successfully, included in these fillers were bentones, clays, talcs, asbestos, silicas, zircon, and the like with and without zinc oxide which tends to harden the coating.

EXAMPLE XXXIV

To show the very superior hardening action and excellent adhesion of two component systems of this invention comprising zinc dust, methyl ethyl ketone (MEK) and a soluble zinc salt such as zinc chloride as one component, and a glycol alkyl silicate binder (called GAS) having a reacted ratio of 1.5 moles of glycol per mole of silicate as the second component, the following table lists first component slurries (FC) which were prepared and aged for a period of 2½ years:

TABLE III

| Composition | 79-3 | 79-4 | 79-5 | 79-6 | 79-7 | 79-8 | 79-9 |
|---|---|---|---|---|---|---|---|
| Zinc dust, lbs. | 5 | 5 | 5 | 5 | 6½ | 5 | 5 |
| Methyl ethyl ketone (MEK), ozs. | 8 | 11 | 20 | — | — | — | — |
| Methyl n-butyl ketone, ozs. | — | — | — | 11 | 8 | 8 | 8 |
| Zinc chloride 2H₂O, grams | 10 | 10 | 30 | 30 | 0 | 24 | 28 |
| Silica (Cabosil M5), ozs. | 0 | 0.75 | 0.75 | 0.75 | 0 | 0 | 3 |
| Talc, ozs. | — | — | — | — | — | — | 2 |

TABLE II

| Composition | 14-1 | 14-2 | 14-3 | 14-4 | 14-5 | 14-6 | 14-7 | 14-8 |
|---|---|---|---|---|---|---|---|---|
| Wt. parts binder solution | 10 | 10 | 10 | 10 | 10 | 10 | 10 | 10 |
| Zinc oxide | 5 | 5 | | 1 | 3 | 3 | 3 | 3 |
| Zinc dust | 25 | 45 | 40 | 40 | 40 | 40 | 40 | 40 |
| Polyvinyl butyral | | | | | | 0.3 | 0.3 | 0.3 |
| Talc (neutral platy) | | | | | | | 1.5 | 1.5 |
| Alcoa Alumina (T61) 325 mesh | | | | | | | | 3.0 |

All of the coatings were firm and adhesive to the clean steel panel, and gave long-lasting protection and could be topcoated promptly (after 3 hours).

Each of these slurries was stable and non-gelling over a 2½ year period (the slurry of Run No. 79-7 was too thick to use satisfactorily as a coating and 79-9 settled out and formed a hard to mix-in layer after 2½ years).

The second component (SC) was prepared by ester exchange between 1.2 moles of ethylene glycol with 1 mole of tetraethyl ortho silicate in the presence of an acid catalyst and with stirring, removal of alcohol therefrom by distillation and dilution with 0.5 wt. part of xylene. This product which was stable over a 2½ year period analyzed 24 wt. % silica; Gravity at 25°C., 1.0395; Acidity calc as HCl, 0.001; Silica content, calc as $SiO_2$, 24.3 wt. %.

EXAMPLE XXXVI

This example shows 2-package system comprising as one package, zinc oxide and zinc dust, and as the other package glycol alkyl silicate (ratio at 1.3:2 moles glycol/mole of tetraethyl ortho silicate) in a hydrocarbon solvent. For example, a glycol alkyl silicate made to have a reacted ratio of 1.3 moles of glycol per mole of silicate was diluted with 0.5 volume of xylene to form a binder solution which was stable over a 2½ year period. This solution was further mixed with less than one-half

TABLE IVA

| Series | 1 | | | | 2 | | | | 6 | | | | 11 | | | 11A | | | 12 | | |
|---|---|---|---|---|---|---|---|---|---|---|---|---|---|---|---|---|---|---|---|---|---|
| Composition | 1 | 2 | 3 | 4 | a | b | c | d | a | b | c | d | 1 | 2 | 3 | 1 | 2 | 3 | 4 | 1 | 2 | 3 |
| Wt. parts of FC | | | | | IN EACH TEST 150 g. of the first component was charged | | | | | | | | | | | | | | | | | |
| Identity of FC | | 79-5 | | | | 79-9 | | | | 79-6 | | | | 79-4 | | | 79-6 | | | | 79-3 | |
| Wt. parts of SC | 10 | 20 | 5 | 30* | 10 | 15 | 20 | 20* | 10 | 20 | 5 | 30 | 10 | 20 | 5 | 10 | 20 | 5 | 10 | 10 | 20 | 5 |
| Properties of Coatings | | | | | | | | | | | | | | | | | | | | | | |
| Fresh FC | | All Excellent | | | | Fair (Inferior to 1 series) | | | | Fair | | | | Excellent | | E (Inferior to coatings made with MEK) | E | G | E | E | E | E |
| 6 Months Old FC | | Same | | | | Same | | | | Same | | | | Same | | | Same | | E | E | G | |
| 2½ Year Old FC | | Same | | | | Same | | | | Same | | | | Same | | | Same | | | Same | | |
| Pot Life of Mix | 1 mo. | 2 mo. | 1 mo. | 2 mo. | | | | | | | | All above 1 week pot life | | | | | | | | | | |
| Coating Properties | | | | | | | | | | | | | | | | | | | | | | |
| After mixing | E | E | E | E | F | F | F | F | F | F | F | F | E | E | E | E | E | G | E | | All | |
| After 1 Day | E | E | G | E | F | F | F | G | F | F | F | F | E | E | E | E | E | E | F | | Excellent | |
| After 3 Days | G | E | X | E | F | F | F | G | F | F | F | F | E | E | G | E | E | F | E | | | |
| After 5 Days | F | G | X | E | F | F | F | E | F | F | F | F | E | E | F | G | E | F | E | | | |

E — Means very superior, hardness 2H to 4H and highly superior adhesion to clean steel.
G — Means a good coating, hardness H to 2H and adhesion to clean steel excellent.
F — Means fair coating of hardness H and somewhat lower.
X — Means gelled.
* — Composition SC also contained a small amount of polyvinyl butyral (PVB), i.e. 5 weight parts of 5% solution of PVB in MEK It can be noted how little binder is required with this system to give excellent coatings. All of these coatings withstood 4000 hrs. in the salt fog test at 2 mil. dry film on clean steel. The ratio of polyol alkyl silicate to zinc in these compositions is as low as 1 of paint to 20 zinc and this permits less cost.

EXAMPLE XXXV

This example describes a two component coating system based on zinc dust in one component and talc and glycol alkyl silicate binder in the other. Binder 59-1 was prepared by mixing 22 lbs. of the ethylene glycol-tetraethyl ortho silicate (ratio of glycol to tetraethyl ortho silicate of 1.3 moles/1 mole) with 18 lbs. of methyl n-butyl ketone, 6 oz. of silica (Cabosil M5) and 6 g. of zinc chloride. The composition was stored in an unlined steel can. This binder had a gravity of 0.93 at 25°C. and contained 12.0 wt. % silica. To make the talc dispersion, 1.5 lbs. of binder 59-1 was mixed with 35 g. Sierra fine, neutral platy talc. To make the coating formulations, 2½ weight parts of zinc dust and 1 part of the talc dispersion were mixed and applied to clean steel panels. The coating was dry to touch in 10 minutes, dry to handle in 15 min., and hard enough to topcoat in 1 hour. The coatings had excellent adhesion, even to clean steel, had excellent galvanic protection at plus 6000 hrs. in salt fog at 95°F., and 5% salt at a film thickness of 3 mils., scored.

% Cabosil M5 to form the first component. The second component was a blend of 5% zinc oxide and zinc dust. To form the coating, 3 parts of the second component was blended with one weight part of the first component, and the mixture was applied as a coating to clean steel. Even when application of this paint occurred in a rain storm, the coating cured adequately to produce a highly superior coating, giving lasting galvanic protection to steel substrates. The pot life of the mix was about 10 days, at which time the coating composition did not gel, but made a somewhat softer coating. The coatings (2.5 mil) withstood 5000 hrs. in salt fog and 2½ years outside, curing scored areas without rusting.

EXAMPLE XXXVII 10 wt. parts of a copolymer (92% polyvinyl chloride, 3% polyvinyl acetate and 6% polyvinyl alcohol in a 20% resin solution in MEK having a viscosity of 60 cps. at 25°C., said solid polymer having a gravity of 1.39) and 200 g. of binder 59-1, described above in Example XXXV were blended together to form a stable vehicle. To form a galvanic paint, 3 wt. parts of zinc dust was mixed with 1 wt. part of the vehicle, and this composition was applied as a coating to a ferrous substrate. The coating hardened to a tough, adhesive, galvanic protective coating overnight. After 1½ years exposure of a scored steel panel having a 2 mil. dry film of this coating, no rusting had occurred. Vinyl topcoats adhered well to this coating.

EXAMPLE XXXVIII 10 wt. parts of polyvinyl acetate resin having a viscosity (20 wt. % in Acetone) of 19 on a Ford No. 4 Cup at 25°C. and a specific gravity of 1.18 was used to make a stable glycol silicate binder containing this resin by mixing 10 wt. parts with 180 wt. parts of binder 59-1 described in Example XXXV. To make a galvanic paint, 1 part of the resin containing binder was mixed with 2.5 wt. parts of zinc dust. The paint, applied as a 4 mil. wet film to clean steel panels, gave excellent protection, and the coating was moderately firm and adhesive.

EXAMPLE XXXIX

Using a low molecular weight polyvinyl butyral resin, a 15 wt. % solution was made in MEK (this polyvinyl butyral is characterized by a 20% soln in 95% alcohol having a viscosity of 55 cps.) 1.85% of this low molecular weight resin solution was dissolved in binder 59-1, described in Example XXXV, to form a binder solution which was stable over a period of 1½ years. To make a paint, 2.5 wt. parts of the binder solution containing the resin was mixed with 7.5 wt. parts of zinc dust, and applied as a coating to clean, cold rolled steel. The resultant coating was somewhat flexible when applied as a one-half mil. coating and was very adhesive and gave protection to the steel against rusting over a period of 1 year. Vinyl paints adhered well to this coating.

In another experiment, 10 wt. parts of the 15% soln of the resin was mixed into 30 wt. parts of a netural talc dispersion having 35 g. talc in 1.5 lbs. of binder 59-1 to form a stable binder which contains 3.7% polyvinyl butyral resin. This blend was stable for a limited period, and to form a coating, 2.5 wt. parts of zinc dust was added to the binder resin blend and applied to a clean, cold rolled steel panel at one-half mil. thickness and at 1 mil. thickness. Both coatings were extremely flexible, hardening rapidly in 10 minutes to permit handling, and capable of taking any kind of bending operation such as is required in the forming of rolled steel into stamped parts. This kind of coating makes possible the application of an inorganic zinc to cold rolled steel for rust protection until used for making formed parts, and permits the further addition of similar coatings to the formed parts after forming without further treatment. The one-half and 1 mil. coated steel panels did not rust out in a 1 year period.

EXAMPLE XL

This example describes the making of a colloidal silica-ethyl silicate copolymer mixture and co-reacting this with a glycol alkyl silicate to form a block copolymer useful in binders in zinc-containing coatings. Excess 2-ethoxyethanol was mixed with a commercial 30% alcoholic silica sol, and alcohol and water were stripped from the mixture until 50% silica remained in solution. To 1.25 pounds of the resulting solution were added 3.8 lbs. of tetraethyl ortho silicate, and 190 ml. ethyl alcohol were distilled therefrom to 160°C., whereupon 1.13 lbs of ethylene glycol was added and 840 ml. more of alcohol removed. The ester-exchange product was a syrupy, white liquid, useful in zinc coatings. In a more desirable experiment, 2.2 moles of ethylene glycol, 1.25 lbs. of the 50% colloidal silica-ethoxyethanol mix and 7 lbs. of tetraethyl ortho silicate were mixed, and 2100 ml. of ethanol distilled therefrom to produce a homogeneous, glycol alkyl silicate-colloidal silica copolymer sol useful in zinc-containing coatings.

EXAMPLE XL-A

This example describes the making of a glycerol alkyl silicate zinc galvanic paint formulation and the testing thereof. 416 grams of an ethyl silicate containing 8% dimer ad 92% monomer (tetra ethoxy silane) was mixed with 93 grams glycerol (USP) and 100 grams of 2-ethoxyethanol and heated in a 3-necked flask to 80°C. in the presence of 2 drops of 66° Be sulfuric acid at which temperature a 50 g. sample was pipetted from the solution, cooled and was found to have a gravity of 0.95 and a silica content of 19%. A 10 g. portion of this liquid was mixed with 30 g. of zinc dust and applied as a coating on cold rolled steel. The coating cured slowly but hardened moderately in 1 day.

The remainder of the product in the flask was heated to effect further ester-exchange and the ethyl alcohol released was distilled therefrom until a total of 170 g. was removed. Periodically and at approximately equal intervals during the ester-exchange reaction, 10 ml. aliquots were removed by pipette and evaluated with zinc dust as a galvanic paint in screening tests. It was noted that as the ester-exchange continued, the products made better and harder coatings and the further the ester-exchange occurred.

The final residue was cooled and, upon cooling, solidified to a gel which would cold flow over a period of time but was easily broken on fast impact. This gel was insoluble in water but dissolved in MEK. This material in MEK, glycol ethers and alcohol free solvents made an excellent zinc dust primer, hardening rapidly and giving exceptional coatings having superior resistance to salt fog.

EXAMPLE XL-B

This example describes the making of a glycol-2-ethoxyethyl silicate as follows (and the evaluation thereof in zinc coatinggs). Charge 416 wt. parts (to a 2 liter RB flask) tetraethoxy silane, 460 wt. parts 2-ethoxyethanol and 129 wt. parts ethylene glycol. Here, the OR groups on the silicate product are either 2-ethoxyethyl groups or pendant hydroxyethyl groups. There was removed from the mixture 390 grams of ethyl alcohol while heating to 138°C. pot temperature, and the recovered bottoms was a clear, colorless liquid having a gravity of 1.049 at 25°C. and a silica content of 17.4% and a Pensky Tag Flash Point of greater than 100°C.

10 weight parts of the bottoms product was blended with 30 wt. parts of zinc dust, and in other similar tests with the zinc containing 5% neutral talc, and in another test with the zinc containing 5% kaolin. Coatings 3 mils thick were applied to cold rolled steel and found to cure to touch in 15 min. and hard in 1 hour. In another experiment, carbon tetrachloride was added to the zinc-dust containing slurry to effect a harder coating, and in another similar test one-half % of ethyl hexoic acid was added to the silicate product prior to mixing with the zinc dust to effect more rapid curing. All of the resulting products had good salt spray resistance (4000 hours salt fog with no rust). The resultant binders were stable for over a 2½ year period with no gelling.

EXAMPLE XLI

This example describes the making of a methoxy ethyl glycol silicate as follows: Charge to liter flask 416 grams tetraethoxy silane, 404 grams methoxy ethanol, 124 grams ethylene glycol, and 2 drops sulfuric acid, 66° Be. The mixture was heated and alcohol distilled therefrom. The bottoms product had a gravity of 1.075, a silica content of 18.5% and weighed 640 grams. The maximum pot temperature was 130°C. The product was tested as the immediately preceding example with zinc dust and was found to give good coatings and to have a shelf life of over 2½ years.

EXAMPLE XLII

In this example, a mixed glycol and polyethylene glycol-glycol alkoxysilicate reaction was prepared by charging 1.5 moles tetraethoxy silane, 0.85 mole ethylene glycol and 0.15 mole polyethylene glycol of 200 mol. wt. in a reaction vessel. The mixture was heated to 70°C. in a liter RB flask and 1 drop of sulfuric acid was added. 155 ml. of ethyl alcohol was distilled from the reaction mixture before it started to gel, 56 g. of xylene was then added to the mixture to liquefy it. The gravity of the product at 30°C. was 1.0, and the product was water white and clear and had a silica content of 24.1%. When tested in a proportion of 1 part binder to 5 parts zinc dust, the product gave a slow curing coating having good protective properties against rusting.

EXAMPLE XLIII

I have discovered that the addition of minor amounts of solvent-soluble polyvinyl butyral and similar polyvinyl alkylal polymers or copolymers to my zinc dust compositions containing polyol silicates, gives improvements for certain applications. In single package coating compositions of this invention the amount of polyvinyl alkylal is often about 0.01 to 1%, preferably about 0.1 to 0.8% based on the polyol silicate. In two package systems these amounts may be about 0.01 to 10%, preferably about 0.5 to 2%. Polyvinyl alkylals can be prepared from the reaction of polyvinyl alcohol with lower alkanals such as butyraldehyde, and more preferably from reaction of polyvinyl acetate dissolved in an alcohol with the aldehyde. The repeating grouping in the structure of the butyraldehyde derived polymer is

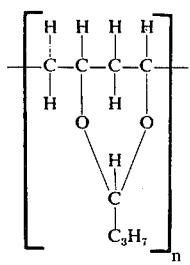

although minor amounts of polyvinyl alcohol or polyvinyl acetate groupings may be copolymerized therein. To be useful in my coatings the polymers must be of an appropriate molecular weight and composition to be soluble and compatible in minor proportions in my compositions and not cause them to gel before use. In addition, the polymers should be used to the extent that in situations where a subsequent organic topcoat is applied to the zinc-glycol silicate primer containing the organic polymeric compounds, they will not be present in composition or extent that will cause poor adhesion and poor bonding compatibility with top-coats applied thereon. I have found that when the polyvinyl-aldehyde polymers are properly used their advantages are increased life of the coating in salty atmospheres, less zinc degradation through white zinc rust and with resultant longer life of the coating, improved galvanic protective properties, better flexibility, improved adhesion to substrates and improved adhesion of vinyl and other compatible solvent-based organic plastic coatings.

By increasing the amount of polyvinyl butyral in the film of the glycol alkyl silicate coating to greater than about 2%, flexible coatings are possible which are useful for coating roll-steel stock which is sold in coils and which is capable of being bent and formed in conventional shaping and bending apparatus and which may be subsequently recoated over the zinc primer with the same or other coatings, either before or after forming, without rusting or rust undercutting occurring during storage or handling. Since some of the compositions can be made to cure rapidly (in seconds or minutes) automated coating devices can be utilized for coating cold rolled steel.

Other polymeric compounds which may be used alone or preferably as copolymers in minor amounts in my compositions are given below.

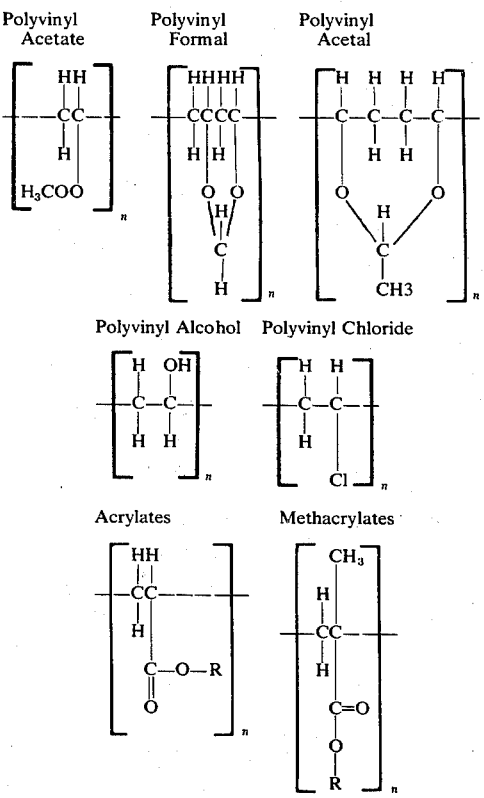

and particularly the hydroxylated acrylates and methacrylates. The R in these formulas is usually lower alkyl such as methyl or ethyl. The polymers may also be polyvinyl pyrollidione or polyoxyalkylene glycols.

Some of the commercial polyvinyl butyral products useful in my zinc-containing polyol silicate coating compositions include the following, with a characterization of their properties: Butvar (Monsanto) with ranges in viscosity of at 10% solution in 95% alcohol of 55 cps. for B79; and up to 1570 cps. for B72A; Union Carbide's polyvinyl butyral, No. XYHL, which was a copolymer of 0.5% polyvinyl acetate, 19.5% of polyvinyl alcohol, and 80% polyvinyl butyral having a specific gravity of 1.12 and an inherent viscosity of 0.9 (ASTM D1243-58 + Procedure A). I have found generally that in the glycol silicate binders in ketone solvents, 2% or less of the polyvinyl butyrals was compatible and stable. In the glycol silicate binders in glycol ether, i.e. alkylcapped glycol, solvents, much higher levels of solubility were possible for longer shelf-life stability without gelling.

Experiments illustrating use of polyvinyl butyral in my polyol silicate binders in zinc dust and ceramic coatings include the following in Table V.

EXAMPLE XLIV

The preparation, properties and use of polyol silicates compounded into single-component formulations with zinc dust are described below:

A glycol-ethyl silicate binder was prepared by heating 1.3 moles of ethylene glycol with 1 mole of tetra ethyl ortho silicate in the presence of a sulfuric acid catalyst and removing the alcohol released, dissolving the resultant bottoms product in sufficient xylene to

TABLE V

| Ingredients | Exp. 45-1 | 2 | 3 | 4 | 5 | 6 | 7 | 8 | 9 | 10 |
|---|---|---|---|---|---|---|---|---|---|---|
| methyl-n-butyl ketone | 40 | 40 | 40 | | 45 | | | | | |
| PVB1 | 2 | 10 | 4 | | | | | | | |
| PVB2 | | | | 10 | | 4 | | 30 | 50 | 0.45 lbs. |
| PVB3 | | | | | | | 10 | | | |
| zinc chloride | 6 | 5 | 4 | | | | | | | |
| zinc dust | 135 | 105 | 400 | 100 | | 200 | 250 | 250 | | 13 lbs. |
| SC1 | 4.5 | 4 | 3 | | | | | | | |
| SC2 | | | | 30 | 380 | | | 70 | 60 | 4 lbs. |
| SC3 | | | | | | 50 | | | | |
| SC4 | | | | | | | 90 | | | |
| Results | thickened and gelled in 2 hrs. | gelled in 5 min. | thickened to unusable consistency | gelled in 5 days (good for 2-pkg.) | | | | binder stable but with zinc gelled in 2 days | binder solid in 4 hours | |
| Description of coating & paint | not run | not run | not run | very flexible | binder stable | binder stable without zinc | | | not run | binder without zinc very stable 1 yr., paint good over 2 wk. period |
| Cure description | not run | not run | not run | coating hard & adhesive | 5 min. very flexible, hard & adhesive coating | | | | not run | |

NOTE: limited shelf life in binder in a ketone solvent necessitates the use of small amounts, e.g., less than 2%, when long storage is contemplated.)

In other compatability tests using 5% of the SCl, the glycol alkyl silicate binder in ketone gels in 2 to 5 days and 6.8% gels the binder in 4 hours. By adding a polyvinyl butyral having fewer reactive groupings, higher levels with improved shelf-life stability can be used.

Designations for preceding table:

PVB1 — is a 20% solution of polyvinyl butyral (PVB) in methyl-n-butyl ketone. This lower molecular weight polyvinyl butyral is characterized by a 10% solution in 95% alcohol having a viscosity of 55 cps. at 25°C.

PVB2 — is a 15% solution of polyvinyl butyral (PBBI) in methyl ethyl ketone (MEK).

PVB3 — is 10% PVBI in MEK.

SCI — is the second component, a glycol alkyl silicate which is defined as SC in Example XXXIV.

SC2 — is another glycol alkyl silicate binder and filler mix containing 5% of finely-divided neutral platy talc in the glycol silicate binder composition 59-1 (described in Example XXXV).

SC3 — binder was a reaction product described in Example XXXIII.

SC4 — is a mix of the reaction product of 150 g. tetraethyl silicate condensed, 44.7 g. glycol, 28.6 g. 2-ethoxyethanol heated to 100°C. in the presence of 1 drop HCl, then cooled, and 1.g. ZnCl₂ and 10 g. finely-divided platy talc were added and diluted with 150 g. 2-ethoxyethanol.

liquefy. The resultant product was stable over a 2½ year period, not changing during this period. The product (GASB) had the following properties:

| GASB | |
|---|---|
| % silica | 24.12 |
| specific gravity at 25 | 1.05 |
| % acidity as HCl | 0.001 |
| appearance | colorless, clear liquid |
| % xylene | 20 |
| freezing point | less than −30°F. below zero. |
| solubility | soluble in xylene, ketone, cyclohexane, oxygenated solvents, glycol ethers, etc. |

It was formulated into a single-component paint as follows:

2 lbs. GASB
3 lbs. methyl ethyl ketone (MEK)
1.5 oz. Cabosil M5 (a pyrogenic silica)
10 g. zinc chloride (ZnCl₂.2H₂O)
13 lbs. zinc dust (No 1 in table).

The GASB, MEK and zinc chloride were blended with the Cabosil M5 and the zinc dust added and sheared briefly into the liquids. The paint was packaged in a one-gallon epoxy-lined can and sealed for 2½ years at from 65° to 95°F., and after this period was placed on a paint shaker for one-half minute, opened and found to be homogeneous and easily used as a paint. The paint was applied (2 mils dry) to cold rolled steel panels, drying to touch in less than 4 minutes and to a hard coating in about one-half hour, and could be topcoated without deleterious effects after 4 hours. The completely cured coating had a pencil hardness of 4H. Salt fog (5% salt − 95°F.) tests for a 3-month period on a scored panel revealed exceptional protection - no rust or rust undercutting, and the scored area was completely healed. The mixed pain had a gravity of 2.35 at 25°C. No gassing or balling up and gelling of the paint occurred during this period.

EXAMPLE XLV

Here, a direct comparison of the curing rates of zinc dust coatings made with binders of hydrolyzed silicates and binders made from the same hydrolyzed silicates with a minor amount of polyol ester-exchanged into the product, shows an advantage of my innovation. Also, comparisons in methods of making and variations in ingredients are described with the effect on the resulting coatings.

Ethyl Silicate 40 is a polymeric siloxane containing an average of slightly over 5 siloxane groupings per molecule and is prepared from tetraethyl ortho silicate by partial hydrolysis in the presence of a trace of hydrochloric acid with distillation of alcohol released therefrom with condensation and neutralization. The equation for the reaction is given:

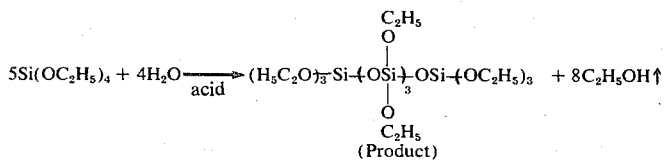

(Product)

The resultant product had 40 wt. % silica and a specific gravity of 1.053 and was a distribution of monomeric, dimeric and polymeric siloxanes.

The following was charged to a large reactor:
3,045 weight parts of the above Ethyl Silicate 40
10,351 weight parts 2-ethoxyethanol 209 weight parts water
0.53 weight parts conc. sulfuric acid added to the water as catalyst.

The mixture was heated to reflux with removal of all ethyl alcohol formed by ester-exchange up to 138°C. (approximately 5,070 weight parts). The remaining bottoms product had a gravity at 25°C. of 1.055 and a silica content of 20 wt. %. The product (45-I) was calculated to be 54% hydrolyzed and condensed.

A small portion of product 45-I was mixed with 3 wt. portions of zinc dust and tested as a coating by painting a cold rolled steel panel. It was discovered that the coating would not cure, even after several days, and in order to attempt to accelerate cure, the blend was made acid until it contained 0.06 wt. % HCl. This higher acid product coating cured to insolubility in acetone after exposing the coating to moist air at 85°F. for 96 hours. This curing is not considered to be rapid enough to be accepted as a usable material since it is so slow, yet, as can be seen below in Table VI, even as little as 11% ethylene glycol in the reaction product accelerated the cure time to only one-half hour.

To test the effect of ester-exchanging ethylene glycol into the above polymeric siloxane, the siloxane was split into several portions and glycol and acid added as follows:

TABLE VI

| Ingredients | Run | Composition, Weight Parts | | | | |
| --- | --- | --- | --- | --- | --- | --- |
| | | 2 | 3 | 4 | 5 | 6 |
| Polymeric Siloxane (45-1) | | ← in each case 1,000 weight parts were added → | | | | 3160 |
| Ethylene Glycol | | 155 | 310 | 620 | 155 | 363 |
| Hydrochloric Acid 37% | | 1.6 | 3 | 3 | 4.8 | 10.4 |
| 2-Ethoxyethanol | | | | | 1155 | 3523 |

(All the above mixtures were heated to 110°C. and cooled.)

Cure Time
(2 mils dry coating) in
test with zinc dust on
steel panel (3 parts
zinc:1 part binder)

←———Dry to touch in about 15 minutes———→

←———Dry to insolubility in acetone in about ½ hour———→

←———Could topcoat in 2 hrs.———→

To make improved coating binders from the above products of Table VI, polyvinyl butyral (Butver 79) was added to each product, and the composite was tested as a zinc dust-containing coating; i.e., 0.4%, 1%, 2%, 3%, 4%, 5% and 10%. In every case but the last two higher ratios, the film cured to a hard and acetone-insoluble, insoluble coating in about 40 minutes. In another test, 0.1% Bentone 27 (xylene wetted) was sheared into the binders to produce a non-sagging paint.

The above experiments were also carried out on a binder prepared by mixing initially the same stoichiometric amounts of water, glycol, 2-ethoxyethanol, tetraethyl silicate and acid catalyst and hydrolyzing, ester-exchanging and removing alcohol all in one step. The resultant product had identical properties and use characteristics, and in similar experiments it was found that any combination could be used, provided that the final equilibration temperature was reached and an acid catalyst was present.

In a third series of experiments similar to the above, stoichiometric mole amounts of 2-methoxyethanol was substituted for the 2-ethoxyethanol with satisfactory results. It was found that alkoxyalkanols were suitable, provided they are volatile enough to evaporate from the coating.

In a fourth series of similar tests, minor amounts (10%) of glycerol, polyethylene glycol (200 and 400 molecular weight) were found to be compatible with the glycol in ester-exchange with the silicate and produced binder paints containing zinc dust which cured well and to commendable coatings.

In a fifth series of tests, it was shown that on varying the degree of hydrolysis of the silicate, the relative mole amount of polyol should be decreased to provide a stable binder useful in coatings. This decrease is based on and calculated from the ratio of moles of monoalkoxy groupings on the silicon atoms in the siloxane polymer per mole of hydroxy grouping on the polyol and the broad range and preferred range are given in the specification. The hydrolysis of the binder may with advantage range between 0 and 75% when polyol is added and the optimum hydrolysis range is about 50% hydrolyzed as shown in this example.

In a sixth series of similar tests, various fillers were added to the binder besides the zinc dust. It was concluded that when the polyvinyl butyral was present, the dilution of the zinc dust with other fillers was not as desirable nor necessary. It was concluded then that fillers that should be added, aside from the zinc, are those which helped suspend the zinc dust and prevented sag.

EXAMPLE XLVI

This series of tests demonstrates the importance of using an acidic catalyst in ester-exchange of the ethylene glycol, and the accelerated curing and hardening of zinc coatings resulting from the presence of the acid in the mix.

| Silicate Reactant A | |
|---|---|
| Tetra kis 2-methoxy ethyl silicate | B.P. 133–134°C. |
| | $n_D^{25}$ 1.41917 |
| | d 25°C. 1.054 |
| | $SiO_2$ = 18.1% |
| Polyol Reactant B | Ethylene glycol |

Binder 46A

No acid catalyst used (acid free) and heated only to 50°C.

328 grams Silicate (Reactant A).

62 grams ethylene glycol (Reactant B) were heated to 50°C.; all became clear, although it was not known whether ester-exchange occurred. A small sample was taken and gravity found to be 1.07, $SiO_2$ of 15%, acidity neutral.

The above was tested in a zinc dust coating on steel (3 mils wet film) by mixing 1 wt. part binder 46A and 3 wt. parts of zinc dust. The film did not cure after several days of exposure to the atmosphere showing that an acidic material is necessary for the desired reaction to occur.

Binder 46B 130 wt. parts of the binder 46A (above) was heated to 110°C. with 28 wt. parts of ethylene glycol, and tested as in the case of Binder 46A with zinc dust. The coating would not harden after several days aging.

Binder 46C

Addition of acid during ester-exchange. Another 130 grams of the product 46A was mixed with one-half drop (0.02 ml.) concentrated HCl (37%) and heated to 100°C., cooled and tested as in a zinc coating as with Binder 46A. Now the film cured rapidly to a hard, adhesive coating. Note that only a trace of acid is necessary for obtaining a workable binder which cures with zinc. It was estimated that the binder had only 0.005% acid calculated as HCl.

Binder 46D

Demonstration of advantage of using a larger amount of acid. To another 130 grams of product 46A was added 0.1 ml. concentrated hydrochloric acid and heated to 100°C., cooled and tested as a binder 46D using 3 grams of zinc/1 gram binder as above. This product cured even more rapidly than Binder 46C and formed a harder coating. Binder 46D had 0.0285% HCl based on binder.

Binder 46E

Demonstration of advantage of using even a larger amount of acid in the binder. To 30 grams of Binder 46A from example above, was added 0.1 ml. concentrated hydrochloric acid (37%) and heated to 100°C. The mix was cooled and tested as above with zinc to determine its value as a binder. The product cured even more rapidly than either Binder 46C or 46D, and was found to be stable over a long period of time as a binder.

Binder 46F

Demonstration of inability to use an excessive amount of a weak acid such as acetic acid. To 30 grams of Binder 46A was added 0.1 g. glacial acetic acid, and the mix was heated to 100°C. Again, this binder was evaluated as above with zinc dust. The mix gelled with zinc dust in only 10 minutes. The coating on steel was soft and not acceptable.

EXAMPLE XLVII

In each experiment below, the binder was prepared by heating the ingredients together to 100°C. without removal of alcohol, cooled and evaluated in a zinc dust paint by mixing 1 wt. part of resultant binder with 3 wt. parts of zinc dust and applied as paint to a clean steel panel.

EXAMPLE XLVIII

This example shows the advantage of using a polyol, hydrocarbon ether silicate and particularly in this case, a glycerol hydrocarbon ether (ethoxyethyl) as a highly useful self-curing binder for making zinc-ethoxyethyl glycol silicate galvanic coatings.

3000 weight parts of the 2-ethoxyethyl polysilicate (or polysiloxane) from Example XLV, designated as 45-1, was mixed with 248 weight parts of glycerol and 0.03 weight parts of 37% hydrochloric acid and heated to 115°C., cooled and evaluated in zinc dust coating formulations. During this syntheses it was found to be advantageous to add the glycerol very slowly to the heated polysiloxane to prevent precipitation of a white, solid material from solution. The resulting binder could be diluted with a hydrocarbon (paraffinic, naphthenic or aromatic) or other organic solvent or could be used as is or diluted with 2-ethoxy ethanol. When mixed in various ratios with zinc dust and optionally other fillers (e.g. clays, talcs, and the like), antisag and suspending agents, and optionally polyvinyl butyral, the galvanic coatings resulting were hard, adhesive, self-curing and highly protective to steel containing substrates. When applied to wet sandblasted steel surfaes, this coating cured to an exceptionally hard, adhesive and rapidly self-curing galvanic coating preventing any rust with undercutting and scratches being self-curing. As in many of the other polyol silicate-zinc dust coatings described herein and particularly those having zinc chloride therein, this versitility in use even over wet sandblasted surfaces permits less costly safer and more healthful and simpler methods of preparing the surface of the steel — by water sandblasting — without any loss of protective abilities of the excellent galvanic coating thereon.

In addition the finished zinc-glycerol, ethoxyethyl silicate paint had a flash point (Pensky Tag closed cup) of over 104°F. and could be regarded as a single package system with adequate pot life to allow mixing large batches and being stable enough to ship to the locus of use as a homogeneous zinc dust paint. Salt spray tests (5% salt at 95°F.) for 4 months on a 3 mil test film on 20 gauge steel panels (wet sandblasted), showed no signs of rust or rust undercutting.

In a similar series of experiments, the ratio of glycerol was increased to 466 grams glycerol per 3000 grams polysiloxane, and in another series to 1000 grams glycerol per 3000 grams polysiloxane. In the former example, the catalyst was 3 drops of 37% HCl and in the latter test, no acid catalyst was used, but a trace was present in the 2-ethoxyethyl polysilicate. The zinc dust binder compositions made with these glycerol-hydrocarbon ether silicates and zinc dust self-cured rapidly to highly protective galvanic coatings. Salt spray (5% salt at 95°F.) tests for 4 months on a 3 mil test film on 20-gauge steel panels showed no signs of rust or rust undercutting.

In a similar series of experiments polysiloxanes which were hydrolyzed to 10, 25, 40, 60 and 70%, respectively, were similarly made as described above using as the ratio of about one-half mole reactive hydroxyl in the polyol per each mole of ester-exchangeable mole grouping on the polysilicate. All of these made excellent zinc dust-silicate coatings giving long life protection against rusting in moist and salty atmospheres, to the ferrous substrates.

TABLE VII

| Ingredients | Run | Composition, Weight Parts | | | | | | |
|---|---|---|---|---|---|---|---|---|
| | | 47-1 | 47-2 | 47-3 | 47-4 | 47-5 | 47-6 | 47-7 |
| Tetraethoxy silane | | 208 | 208 | 208 | 208 | 20.8 | 208 | 208 |
| Ethylene Glycol | | 62 | 62 | 62 | 62 | | 62 | 62 |
| Diethylene Glycol | | 10 | 30 | | | | | |
| Polyethylene Glycol 400 | | | | | | | | 30 |
| Glycerol | | | | 30 | 10 | 5 | 10 | |
| Polyethylene Glycol 200 | | | | | | | | 30 |
| 2 Ethoxyethanol | | | | 10 | 275 | 15 | 275 | |
| HCl (37%) Mixture talc added to binder when hot | | 0.05 | 0.05 | 0.05 | 0.05 | 0.1 | 0.62 | 0.05 |
| Additional Ingredients Added to Above | | | | | | | | |
| Isopropanol | | | | | | | | |
| t-butanol | | | | | | | | |
| Results of Test with Zinc Dust in Coating | | Coatings poor, slow drying. | | Cured adequately to give a good, hard protective coating having excellent spray (at 3 mils) protective properties over 400 hrs. | Coating softer but adequate for protecting. | Cured in 1 hr. to yield a fairly hard coating. | Much harder than 47-4. | Coating cured slowly but formed a hard film, adhesive coating. |

| Ingredients | Run | Composition, Weight Parts | | | | | | |
|---|---|---|---|---|---|---|---|---|
| | | 47-8 | 47-9 | 47-10 | 47-11 | 47-12 | 47-13 | 47-14 |
| Tetraethoxy silane | | 208 | 208 | | | | | 104 |
| Ethylene Glycol | | 62 | 124 | ADDED 100 WT. PARTS 47-9. | | | ADDED 70 47-9. | |
| Diethylene Glycol | | | | | | | | |
| Polyethylene Glycol 400 | | 30 | | | | | | 100 |
| Glycerol | | | | | | | | |
| Polyethylene Glycol 200 | | | | | | | | |
| 2 Ethoxyethanol | | | 180 | | | | | |
| HCl (37%) Mixture talc added to binder when hot | | 0.05 | 0.1 | | | | | |
| Additional Ingredients Added to Above | | | | | | | | |
| Isopropanol | | | | 80 | | | | |
| t-butanol | | | | | 5 | 10 | 20 | |
| Results of Test with Zinc Dust in Coating | | Coating cured to a softer film than | Firm, hard coatings resulting in each case. Dried slowly (15 min.) but cured in about ¾ hr. to insolubility in acetone. The binders were exceptionally stable. | | | | | Coating too slow drying to be useful in most applications. |

TABLE VII-continued

| Ingredients | Run | Composition, Weight Parts | | | | | | |
|---|---|---|---|---|---|---|---|---|
| | | 47-1 | 47-2 | 47-3 | 47-4 | 47-5 | 47-6 | 47-7 |
| | 47-7. | | | | | | | |

EXAMPLE XLIX

This series of examples shows the utility of using glycol alkyl silicates having the reacted mole ratios of ethylene glycol to tetraethyl silicate of 2 to 1, 1.8 to 1 and 2.4 to 1 in zinc dust paints comprising MEK and having a shelf life of over 2½ years. 3000 grams of condensed ethyl silicate having 90% monomer, 8% dimer and 2% trimer, and 1350 gms. ethylene glycol were heated to reflux and 5 drops of sulfuric acid added and 1,325 g. ethyl alcohol distilled therefrom. The product had a mole ratio of glycol/silicate of 2/1. Similar reactions were made, adjusting in each case the mole ratio of glycol/silicate to 1.8/1 and 2.4/1. To 50 g. of each of these products was added 50 g. MEK and 250 g. fresh zinc dust. The resultant paint was homogeneous and usable after 2½ years aging in a simple container, and when applied to a cold rolled steel panel, said coating was hard, adhesive and highly protective in salt fog tests. Portions of the zinc silicate paints made from these glycol silicates were mixed with zinc chloride in proportions ranging from 0.5 to 10%, and the resultant paint mixes applied over steel panels containing mil scale. The 3 mil dry films were tested over extended periods for galvanic protection and were found to withstand 4000 hours of salt fog testing (95°F. and 5% salt) with no further rusting or rust undercutting, demonstrating the utility of these valuable coatings even over rusty surfaces.

EXAMPLE L

In this experiment, 1000 g. ethyl silicate condensed (95% monomer) was heated to 112°C. with 290 g. ethylene glycol and 1/2 drop of butyl titanate added with no noticeable ester-exchange reaction as evidenced by no distillation of alcohol. Thereafter, 0.1 g. of boric oxide ($B_2O_3$) was added and still no reaction took place. When 0.03 ml. of concentrated sulfuric acid was then added, alcohol started coming off rapidly showing the transesterification reaction had started. The alcohol was removed to a point of product gelling, and the product cooled and was dissolved in MEK and 30 g. of hexamethyl disiloxane (a known silicone capping agent) added at 80°C. This material acted as a capping agent for any silanol groups which may have formed during aging. 105 wt. parts of the product binder was mixed with 2 parts of zinc chloride, 40 parts of talc and 100 parts of MEK, and 700 parts of zinc dust, and the slurry was well-mixed and stored for 2½ years. The product paint in a common tinned paint can was completely stable as a single package paint for over 2½ years, and the coating made therefrom was satisfactory, giving a galvanic, self-curing protective film over a steel substrate. The coating gave excellent salt fog protection (3 mil dry film — no rust, 3000 hours salt fog at 95°F., 5% salt) on a cold rolled steel panel.

EXAMPLE LI

In an open beaker the following were mixed together and heated to 110°C.
24.8 g. Ethylene glycol
74.4 g. Ethyl Silicate 40 (a siloxane and silicate polymer having an average of 5 SiO groups per molecule and having a distribution of from 1 SiO to 15 SiO groups per molecule and having 40 weight % silica and a gravity of 1.051)
201.0 g. Butyl cellosolve
0.4 ml. HCl (as catalyst)

This binder was stable for 2½ years and was tested on several occasions during this period with zinc dust as a zinc coating using 1 weight part binder to 3 weight parts of zinc dust and was found to work excellently as a galvanic paint for a steel substrate. The coating was slow drying because of the low volatility of the solvent but produced an excellent coating.

EXAMPLE LII

Mixed and heated to 80°C. in an open beaker the following:
74.4 g. Ethyl Silicate "40"
4.68 g. Water
7.5 g. Ethylene glycol
212 g. Methoxy ethanol
0.1 ml. HCl The binder sample was tested periodically as in Example 51 with zinc dust as a galvanic coating and was found to work excellently over an extended period. The binder was calculated to have 70% hydrolysis and condensation.

EXAMPLE LIII 74.4 g. Ethyl Silicate 40 as described in Example 51
4.68 g. Water
4.0 g. Ethylene glycol
212 g. Methoxy ethanol
0.1 ml. HCl The binder was sample tested periodically as in Example 51 with zinc dust as a galvanic coating and was found to work excellently as a galvanic paint

EXAMPLE LIV

In a glass flask reactor the following were mixed and heated to reflux and alcohol removed by distillation therefrom to a point of gelation
3.75 lbs. Ethyl Silicate 40 (described in Example 51)
1.24 lbs. Ethylene glycol
2.85 lbs. 2-Ethoxy ethanol The maximum pot temperature reached was 135°C. at which time the mix gelled solid. To solubilize the mix varying increments of 2 ethoxy ethanol were added and heated each time to 135°C. to attempt to find the amount required to permanently solubilize the mix. It was noted that as in former examples a slight mole excess of monofunctional compound, in this case 2 ethoxy ethanol is necessary to prevent excessive gelling or polymer buildup due to excessive polymerization. This mole ratio is based on the number of ester-exchangeable groupings in the hydrolyzed binder and the need for excess monofunctional compound is especially important to avoid gelling when there are numerous

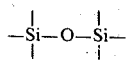

(siloxane) groupings per polymeric reactant molecule and the ratio of polyol/silicate is such as to allow formation of the high polymeric structure. The ethoxy ethanol acts as a chain ter-minator to stabilize the mix. When the above mix was diluted with an additional 1.80 lbs. of ethoxy ethanol it did not gel on heating and eventual dilution with ethoxy ethanol was made to give a total charge and weight balance as follows.

3.75 lbs. Ethyl Silicate 40
6.55 lbs. 2-ethoxy ethanol
1.24 lbs. Ethylene glycol
11.54 lbs. total change
2.3 lbs. Ethyl alcohol distilled therefrom
9.24 lbs. Product: Properties: clear white; gravity 1.04 at 25°C.; Silica 16%

A number of excellent stable binders were made from the above by dilution with various hydrocarbon ethers and solvents as follows and storage samples made for testing:

a. Dilute 50:50 with 2 ethoxy ethanol and added various proportions of a strong mineral acid as follows and stored for 2½ years and tested periodically a-1. 50:50 with 2 ethoxyethanol - gravity 0.98 at 25°C. — 8% Silica a-2. 75:25 with 2 ethoxy ethanol (Binder): 2 ethoxy ethanol Properties of (a-2) gravity 1.01 at 25°C.; 12% Silica In each case 1 pint of each of the above was mixed with the following ratios of HCl (37%) and evaluated as a binder over an extended period.

½ ml. HCl
¼ ml. HCl
1 ml. HCl
2 ml. HCl.

All samples were quite stable over extended periods of time and all yielded excellent coatings with zinc dust.

Various other fillers and suspending agents were tested with these binders — i.e. neutral talc, kaolin, bentonite, and found to give favorable coatings with the zinc.

EXAMPLE LV 3.0 lbs. ethyl silicate condensed containing 6% dimer and 2% trimer
2.61 lbs. 2 ethoxy ethanol
0.9 lbs. ethylene glycol were mixed and heated to 147°C. and a total of 2.528 lbs of alcohol was stripped off. I calculated that this was nearly the theoretical amount of alcohol present.

20% silica

Product analysis (called Silicate No. 55): 0.0016 acidity; 1.079 gravity.

The following dilutions were made with Silicate 55 to form stable binders.

55a. 50 wt. pts. above Silicate No. 55
50 wt. pts. 2 ethoxy ethanol
0.5 wt. pts. Hydrochloric acid (37%)
mixed in a beaker at room temperature and found to be stable and yield excellent inorganic zinc silicate coatings in a ratio of 1 binder to 2 to 8 wt. parts of zinc dust.

55b. 50 wt. pts. Silicate No. 55
50 wt. pts. Propylene glycol methyl ether
0.2 wt. pts. Hydrochloric acid
10 wt. pts. Neutral Magnesium Silicate
} mixed at room temperature This binder was again very useful in zinc silicate coatings in a ratio range of 1 binder to 6 zinc dust.

Other fillers tried were kaolin, bentonite, alumina, silica, and zircon and were found to give a variety of good coatings with the zinc dust.

EXAMPLE LVI

In a small beaker the following were heated to boiling
4½ wt. pts. Glycerol
8 wt. pts. Isopropoxytrimethoxy silicate
10 wt pts. Propylene glycol methyl ether.
heated to 80°C. to effect ester exchange. The product was cooled and tested in zinc dust coatings as in Example 55 and found to perform excellently to give hard adhesive coatings.

EXAMPLE LVII

The procedure for Example 57 was repeated using
34.2 g. Hexaethoxy disiloxane
12.4 Ethylene glycol
74.4 g. Propylene glycol methyl ether 1 g. Hydrochloric acid (37%)

This made a satisfactory coating with zinc dust in a 1 binder to 4 zinc dust ratio, drying slowly to a hard, adhesive coating.

It is claimed:

1. An essentially anhydrous polyol silicate composition consisting essentially of solvent-soluble, polyol silicate ester-exchange reaction product of (1) silicate consisting essentially of a member selected from the group consisting of ortho silicates having esterexchangeable groups of 1 to 6 carbon atoms selected from the group consisting of alkyl, hydroxyalkyl, alkoxyalkyl and hydroxyalkoxyalkyl, siloxanes thereof and their mixtures, and (2) aliphatic polyol which is ester-exchangeable with (1) said reaction product being made by reacting (1) and (2) in amounts providing a ratio of hydroxyl groups of (2) of about 0.15 to 1.8 moles per mole of ester-exchangeable group of (1); and finely divided metallic zinc in an amount sufficient to provide galvanic protection when the composition is cured on a ferrous substrate.

2. The composition of claim 1 in which the reaction product is free of a portion of alcohol formed by the ester-exchange reaction.

3. A composition of claim 1 wherein the mole ratio of hydroxyl groups of (2) is about 0.35 to 0.9 per mole of ester-exchangeable groups of (1).

4. The composition of claim 1 in which ester-exchangeable groups of (1) are alkyl or alkoxyalkyl.

5. A composition of claim 1 in which said esterexchange reaction product is in a non-gelling organic solvent.

6. A composition of claim 5 in which the solvent is selected from the group consisting of methyl ketones other than acetone, alkoxyalkanols, alcohols, hydrocarbons, and mixtures thereof.

7. A composition of claim 6 in which the mole ratio of hydroxyl groups of (2) is about 0.35 to 0.9 per mole of ester-exchangeable group of (1).

8. A composition of claim 6 in which the finely divided zinc is in an amount of about 50 to 98% based on the total weight of the polyol silicate reaction product and metallic zinc.

9. A composition of claim 1 in which said ester-exchange reaction product has therein ester-exchangeable alkanol or alkoxyalkanol.

10. A composition of claim 1 in which (2) is a glycol and the ester-exchange reaction is conducted at a temperature of about 50° to 160°C.

11. A composition of claim 10 in which the ester-exchangeable groups of (1) have up to 4 carbon atoms and are selected from the group consisting of alkyl and alkoxyalkyl.

12. A composition of claim 11 in which said ester-exchange reaction product has therein ester-exchangeable alkanol or alkoxyalkanol.

13. A composition of claim 1 which contains a minor amount of solvent-soluble polyvinyl alkylal polymer.

14. A composition of claim 13 in which the polyvinyl alkylal polymer is polyvinyl butyral.

15. The composition of claim 14 in which (1) has up to about 10 silicon atoms per molecule and its ester-exchangeable groups are alkyl or alkoxyalkyl of up to 4 carbon atoms, (2) is ethylene glycol, propylene glycol or glycerol, the ratio of hydroxyl groups of (2) is about 0.35 to 0.9 moles per mole of ester-exchangeable group of (1), and the reaction is acidcatalyzed.

16. The composition of claim 15 in which the ester-exchange reaction product is in a solvent selected from the group consisting of methyl ketones other than acetone, alkoxyalkanols, alcohols, hydrocarbons, and mixtures thereof.

17. The composition of claim 16 in which is included zinc oxide in an amount sufficient to improve the curing properties of the composition.

18. The composition of claim 1 wherein said reaction product is made at a temperature of about 50° to 160°C.

19. A composition of claim 1 in which the major portion of (2) is selected from the group consisting of ethylene glycol, propylene glycol and glycerol.

20. A composition of claim 9 in which the ester-exchange reaction is acid-catalyzed.

21. A composition of claim 20 in which the ester-exchange reaction is conducted at a temperature of about 50° to 160°C.

22. A substantially anhydrous, polyol silicate composition consisting essentially of solvent-soluble polyol silicate ester-exchange reaction product of (1) silicate having up to about 10 silicon atoms per molecule consisting essentially of a member selected from the group consisting of tetra ortho silicates having ester-exchangeable groups which are alkyl or alkoxyalkyl having 1 to 4 carbon atoms, siloxanes thereof and their mixtures, and (2) polyol ester-exchangeable with (1) consisting essentially of a member selected from the group consisting of ethylene glycol, propylene glycol, and glycerol, said reaction product being made by reacting (1) and (2) at a temperature of about 80° to 160°C. in amounts providing a ratio of hydroxyl groups of (2) of about 0.15 to 1.8 moles per mole of ester-exchangeable group of (1); and zinc dust in an amount sufficient to provide galvanic protection when the composition is cured on a ferrous substrate.

23. A composition of claim 22 wherein (2) is ethylene glycol and the ester-exchange reaction is acid-catalyzed.

24. A composition of claim 23 wherein ester-exchangeable groups of (1) are ethyl or ethoxyethyl.

25. A composition of claim 24 wherein the ratio of hydroxyl groups of (2) is about 0.35 to 0.9 per mole of ester-exchangeable groups of (1).

26. The composition of claim 24 wherein said ester-exchange reaction product has therein ester-exchangeable alkanol or alkoxyalkanol.

27. A composition of claim 22 in which said ester-exchange reaction product is in a non-gelling organic solvent.

28. A composition of claim 27 in which the solvent is selected from the group consisting of methyl ketones other than acetone, alkoxyalkanols, alcohols, hydrocarbons, and mixtures thereof.

29. A composition of claim 28 wherein (2) is ethylene glycol and the ester-exchangeable groups of (1) are ethyl or ethoxyethyl and the ester-exchange reaction is acid-catalyzed.

30. A liquid composition of claim 29 wherein the mole ratio of hydroxyl groups of (2) is about 0.35 to 0.9 per mole of ester-exchangeable groups of (1).

31. A composition of claim 30 wherein the finely divided zinc is in an amount of about 50 to 98% based on the total weight of the polyol silicate reaction product and metallic zinc.

32. A composition of claim 19 having filler selected from the group consisting of finely divided silica, metal oxides and metal silicates.

33. A composition of claim 32 in which the filler is one or both of talc and zinc oxide in an amount sufficient to improve the curing properties of the composition.

34. A composition of claim 28 which contains an acidic curing catalyst for the composition.

35. A composition of claim 34 which contains one or both of talc and zinc oxide in an amount sufficient to improve the curing properties of the composition.

36. A composition of claim 35 containing zinc chloride or zinc acetate as a curing catalyst.

37. A liquid composition of claim 36 in which the polyol silicate reaction product is of ethylene glycol and tetraethyl silicate, a siloxane thereof having up to about 10 silicon atoms per molecule, or mixtures thereof.

38. A solvent-soluble polyol silicate composition of claim 1 in which the reaction product consists essentially of ester-exchange reaction product of (1) $(RO)_4Si$ in which R has up to about 6 carbon atoms and is selected from the group consisting of alkyl and alkoxyalkyl, and (2) $(HOMO)_4Si$ in which M is an aliphatic diol minus two hydroxyl groups; said reaction product being made by reacting (1) and (2) in amounts providing a ratio of ester-exchangeable groups of (1) of about 0.2 to 11 moles per mole of hydroxyl group of (2).

39. The composition of claim 38 in which M is $-CH_2CH_2-$.

40. The composition of claim 39 in which the reaction is acid-catalyzed at a temperature of about 80° to 160°C.

41. The composition of claim 40 in which the ratio of ester-exchangeable groups of (1) is about 0.3 to 5 moles per mole of hydroxyl group of (2).

42. The composition of claim 41 in which the solvent is selected from the group consisting of methyl ketones other than acetone, alkoxyalkanols, alcohols, hydrocarbons, and mixtures thereof.

43. The composition of claim 15 in which is included naturally-occurring basic filler.

44. The composition of claim 1 in which is included naturally-occurring basic filler.

* * * * *

UNITED STATES PATENT AND TRADEMARK OFFICE
CERTIFICATE OF CORRECTION

PATENT NO. : 3,917,648
DATED : November 4, 1975
INVENTOR(S) : GORDON D. McLEOD

It is certified that error appears in the above-identified patent and that said Letters Patent are hereby corrected as shown below:

Column 2, line 22, "used" should read --based--.

Column 3, line 4, "zinc silicate" should read --zinc and silicate--.

Column 4, line 17, "together for" should read --together and for--.

Column 4, line 44, after "zinc" insert --silicate--.

Column 5, line 50, "and and" should read --and an--.

Column 5, line 50, "as a salt" should read --as a zinc salt--.

Column 9, line 49, "1.35" should read --0.35--.

Column 11, line 34, "glycol-alike" should read --glycol-alkyl--.

Column 14, line 26, "does seem" should read --does not seem--.

Columns 41 and 42, Table IVA - "Inferior to coatings made with MEK" should appear under "Fair".

Columns 53 and 54, Table VII, before "47-9" in column "47-13", add --WT PARTS--.

Claim 20, line 1, "9" should read --19--.

Claim 32, line 1, "19" should read --27--.

Signed and Sealed this

Seventh Day of September 1976

[SEAL]

Attest:

RUTH C. MASON
*Attesting Officer*

C. MARSHALL DANN
*Commissioner of Patents and Trademarks*